(12) United States Patent
Sheppard et al.

(10) Patent No.: US 12,346,920 B2
(45) Date of Patent: *Jul. 1, 2025

(54) METHODS AND APPARATUS TO CORRECT FOR DETERIORATION OF A DEMOGRAPHIC MODEL TO ASSOCIATE DEMOGRAPHIC INFORMATION WITH MEDIA IMPRESSION INFORMATION

(71) Applicant: The Nielsen Company (US), LLC, New York, NY (US)

(72) Inventors: Michael Sheppard, Holland, MI (US); Jonathan Sullivan, Hurricane, UT (US); Matthew B. Reid, Alameda, CA (US); Alejandro Terrazas, Santa Cruz, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,531

(22) Filed: May 3, 2024

(65) Prior Publication Data
US 2024/0296472 A1 Sep. 5, 2024

Related U.S. Application Data

(63) Continuation of application No. 17/855,259, filed on Jun. 30, 2022, now Pat. No. 11,983,730, which is a (Continued)

(51) Int. Cl.
*H04N 21/81* (2011.01)
*G06F 17/18* (2006.01)
(Continued)

(52) U.S. Cl.
CPC ......... *G06Q 30/0204* (2013.01); *G06F 17/18* (2013.01); *G06Q 30/0201* (2013.01);
(Continued)

(58) Field of Classification Search
CPC ........... G06Q 30/0204; G06Q 30/0201; G06Q 30/0246; G06F 17/18; H04N 21/252;
(Continued)

(56) References Cited

U.S. PATENT DOCUMENTS 7,788,216 B2 * 8/2010 Li ..................... G06Q 30/02
707/603
7,882,242 B2 * 2/2011 Chen ................. H04Q 3/0045
709/227

(Continued)

*Primary Examiner* — Nathan J Flynn
*Assistant Examiner* — Christine A Kurien

(57) ABSTRACT

Methods and apparatus to correct for deterioration of a demographic model to associate demographic information with media impression information are disclosed. An example method includes estimating first and second ages of audience members based on demographic information; estimating a third age of an audience member who is not included in the audience members; applying a window function to the second ages to determine a distribution of ages based on the third age; multiplying window values by the first ages to determine corrected first age components; dividing a total of the corrected first age components by a sum of the window values to determine an estimated age of the audience member at a first time; and determining the corrected age of the audience member at a second time based on the estimated age of the audience member at the first time and a time difference between the first and second times.

20 Claims, 14 Drawing Sheets

Related U.S. Application Data continuation of application No. 17/156,349, filed on Jan. 22, 2021, now Pat. No. 11,381,860, which is a continuation of application No. 14/980,821, filed on Dec. 28, 2015, now abandoned.

(60) Provisional application No. 62/098,787, filed on Dec. 31, 2014.

(51) Int. Cl.
  *G06Q 30/0201* (2023.01)
  *G06Q 30/0204* (2023.01)
  *G06Q 30/0242* (2023.01)
  *H04N 21/25* (2011.01)
  *H04N 21/258* (2011.01)
  *H04N 21/45* (2011.01)
  *H04N 21/466* (2011.01)

(52) U.S. Cl.
  CPC ....... *G06Q 30/0246* (2013.01); *H04N 21/252* (2013.01); *H04N 21/25883* (2013.01); *H04N 21/4532* (2013.01); *H04N 21/4665* (2013.01); *H04N 21/4667* (2013.01); *H04N 21/812* (2013.01)

(58) Field of Classification Search
  CPC ......... H04N 21/25883; H04N 21/4532; H04N 21/4665; H04N 21/4667; H04N 21/812
  See application file for complete search history.

(56) References Cited

U.S. PATENT DOCUMENTS

| | | | | |
|---|---|---|---|---|
| 7,941,525 B1* | 5/2011 | Yavilevich | H04L 67/02 | 709/224 |
| 7,949,565 B1* | 5/2011 | Eldering | H04H 20/10 | 705/14.49 |
| 7,958,234 B2* | 6/2011 | Thomas | G06F 11/3476 | 709/224 |
| 7,962,603 B1* | 6/2011 | Morimoto | G06F 16/95 | 709/224 |
| 8,046,255 B2* | 10/2011 | Bistriceanu | G06Q 30/0236 | 705/14.27 |
| 8,060,601 B1* | 11/2011 | Brown | G06Q 30/0277 | 709/224 |
| 8,131,763 B2* | 3/2012 | Tuscano | G06F 16/9535 | 725/28 |
| 8,131,861 B2* | 3/2012 | Butler | G06F 16/957 | 709/228 |
| 8,229,780 B2* | 7/2012 | Davidow | G06Q 30/0241 | 705/7.29 |
| 8,266,687 B2* | 9/2012 | Baldry | G06F 21/6218 | 713/168 |
| 8,271,886 B2* | 9/2012 | Lee | G06F 16/9535 | 715/745 |
| 8,302,120 B2* | 10/2012 | Ramaswamy | G06Q 30/02 | 725/10 |
| 8,307,006 B2* | 11/2012 | Hannan | G06Q 30/02 | 707/706 |
| 8,370,489 B2* | 2/2013 | Mazumdar | G06Q 30/0201 | 709/224 |
| 8,504,507 B1* | 8/2013 | Srinivasaiah | G06Q 30/00 | 706/46 |
| 8,549,552 B2* | 10/2013 | Ramaswamy | H04R 29/00 | 725/18 |
| 8,631,122 B2* | 1/2014 | Kadam | G06F 16/95 | 709/224 |
| 8,700,457 B2* | 4/2014 | Craft | G06Q 20/3274 | 705/14.34 |
| 8,751,461 B2* | 6/2014 | Abraham | G06Q 10/0637 | 707/706 |
| 8,909,771 B2* | 12/2014 | Heath | G06Q 30/02 | 709/224 |
| 8,910,195 B1* | 12/2014 | Barney | H04H 60/31 | 725/14 |
| 8,954,536 B2* | 2/2015 | Kalus | H04L 67/535 | 709/219 |
| 9,617,467 B2* | 4/2017 | Liu | H01L 33/502 | |
| 9,628,904 B2* | 4/2017 | Shin | H04M 1/6058 | |
| 9,641,495 B2* | 5/2017 | Markovich | H04L 63/08 | |
| 2016/0191970 A1* | 6/2016 | Sheppard | G06F 17/18 | 725/14 |

* cited by examiner

| APDFID | 2-11 | 12-14 | 15-17 | 18-20 | 21-24 | 25-29 | 30-34 | 35-39 | 40-44 | 45-49 | 50-54 | 55-64 | 65+ |
|---|---|---|---|---|---|---|---|---|---|---|---|---|---|
| A1 | 24.0% | 70.0% | 0.0% | 0.0% | 0.0% | 0.0% | 0.0% | 4.0% | 0.0% | 0.0% | 2.0% | 0.0% | 0.0% |
| A2 | 0.0% | 100.0% | 0.0% | 0.0% | 0.0% | 0.0% | 0.0% | 0.0% | 0.0% | 0.0% | 0.0% | 0.0% | 0.0% |
| A3 | 6.2% | 32.3% | 60.0% | 0.0% | 0.0% | 0.0% | 0.0% | 1.5% | 0.0% | 0.0% | 0.0% | 0.0% | 0.0% |

AGE PROBABILITY DENSITY FUNCTIONS

FIG. 4

| UID | AGE PDF ID | PREDICTION DATE |
|---|---|---|
| 8PR6PYRGQC | A7 | 2015-10-23 |
| ERX269AS22 | B9 | 2016-11-24 |
| ZBX9A8C5NA | D1 | 2018-02-09 |
| W7WWUTDJFF | A3 | 2018-12-05 |
| 3RX2VH3K2E | C5 | 2019-07-02 |

PREDICTED AGE PROBABILITY DENSITY FUNCTIONS
STORED IN THE AGE CACHE

FIG. 5

METHODS AND APPARATUS TO CORRECT FOR DETERIORATION OF A DEMOGRAPHIC MODEL TO ASSOCIATE DEMOGRAPHIC INFORMATION WITH MEDIA IMPRESSION INFORMATION

CROSS-REFERENCE TO RELATED APPLICATIONS

This disclosure arises from a continuation of U.S. patent application Ser. No. 17/855,259, now U.S. Pat. No. 11,983,730, filed on Jun. 30, 2022, which is a continuation of U.S. patent application Ser. No. 17/156,349, now U.S. Pat. No. 11,381,860, filed on Jan. 22, 2021, which is a continuation of U.S. patent application Ser. No. 14/980,821, filed on Dec. 28, 2015, which claims the benefit of U.S. Provisional Patent Application Ser. No. 62/098,787, filed Dec. 31, 2014. U.S. patent application Ser. No. 17/855,259, U.S. patent application Ser. No. 17/156,349, U.S. patent application Ser. No. 14/980,821, and U.S. Provisional Patent Application Ser. No. 62/098,787 are hereby incorporated herein by reference in their entireties. Priority to U.S. patent application Ser. No. 17/855,259, U.S. patent application Ser. No. 17/156,349, U.S. patent application Ser. No. 14/980,821, and U.S. Provisional Patent Application Ser. No. 62/098,787 is hereby claimed.

FIELD OF THE DISCLOSURE

This disclosure relates generally to audience measurement, and, more particularly, to methods and apparatus to correct for deterioration of a demographic model to associate demographic information with media impression information.

BACKGROUND

Traditionally, audience measurement entities determine audience engagement levels for media based on registered panel members. That is, an audience measurement entity enrolls people who consent to being monitored into a panel. The audience measurement entity then monitors those panel members to determine media (e.g., television programs or radio programs, movies, DVDs, advertisements, streaming media, websites, etc.) exposed to those panel members. In this manner, the audience measurement entity can determine exposure metrics for different media based on the collected media measurement data.

Techniques for monitoring user access to Internet resources such as web pages, advertisements and/or other Internet-accessible media have evolved significantly over the years. Some known systems perform such monitoring primarily through server logs. In particular, entities serving media on the Internet can use known techniques to log the number of requests received for their media (e.g., content and/or advertisements) at their server.

BRIEF DESCRIPTION OF THE DRAWINGS

FIG. 4 illustrates example age distribution functions used to correct age misattribution.

FIG. 5 illustrates an example data structure to store predicted age distribution functions for the subscribers of a database proprietor.

DETAILED DESCRIPTION

Figure 1:
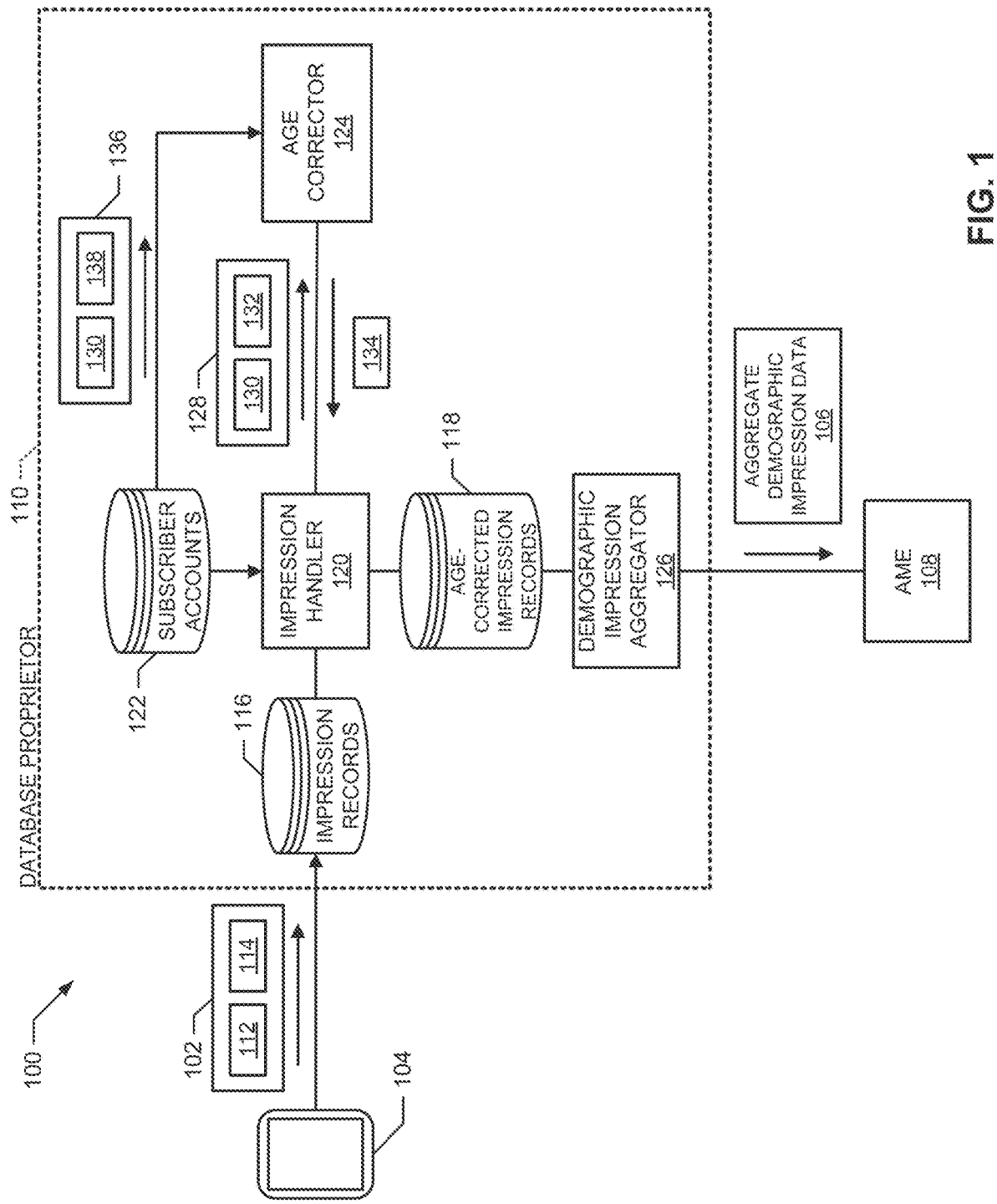
FIG. 1 illustrates an example system to collect impressions of media presented at computing devices and to produce aggregate age-correction demographic impression data.

Examples disclosed herein may be used to correct age-based demographic group misattribution errors in impressions collected by database proprietors. As used herein, an impression is an instance of a person's exposure to media (e.g., content, advertising, etc.). When an impression is logged to track an audience member's exposure to particular media, the impression may be associated with demographics of the person corresponding to the impression. This is referred to as attributing demographic data to an impression, or attributing an impression to demographic data. As used herein, a demographic impression is an impression with attributed demographic data. In this manner, media consumption behaviors of audiences and/or media exposure across different demographic groups can be measured. Example demographic groups include demographic groups defined by a range of ages (sometimes referred to herein as "age-based demographic groups" and/or "demographic buckets"). For example, demographic buckets may be defined for ages 8-12, 13-17, 18-24, 25-34, 35-44, 45-54, 55-64, and 65+. However, age-based demographic group misattribution errors in collected impressions can occur when the actual age of the person corresponding to the impression is different than the reported age of the person. Such misattribution errors decrease the accuracy of audience measurement. To improve accuracies of impression data having age-based demographic group misattribution errors, examples disclosed herein may be used to predict the actual age of a person, storing that prediction, and calculating an updated age when an impression corresponding to that person is logged.

In some cases, an age prediction model uses baseline information (e.g., from a database proprietor) to estimate the age of an audience member (e.g., a subscriber to a service of the database proprietor) when the audience member is exposed to a media campaign. In some examples, the age prediction model has the highest accuracy that the model can provide on the day the baseline information was obtained, and the accuracy of the age prediction model degrades afterwards at some rate of deterioration. This accuracy deterioration may be negligible for short term measurements. However, using an old model to predict a person's age would potentially result in biased estimates of the person's age.

Disclosed examples increase the useful life of an age prediction model. That is, disclosed examples lengthen the time that an age prediction model can be used to predict ages of anonymous audience members between calibrations. Because certain audiences may be anonymous (e.g., personally identifiable information may not be obtained or obtainable) for technical and/or privacy reasons, measurement of media viewing occurring over the Internet occurs in aggregate and demographic information must be modeled and/or corrected for sources of bias that are inherent to online audience measurement. Example methods and apparatus disclosed herein provide an improvement to the field of audience measurement by increasing the accuracy of measurement for audience demographics, given a set of audience information that is valid at a first time and changes over time. Such audience information may not be available at a later time. While re-calibration and/or re-training of a model may be performed, in many cases such re-calibration and/or re-training may be expensive (e.g., to repeatedly purchase new, up-to-date data), and/or impractical or impossible (e.g., if up-to-date data is not readily available). Disclosed examples increase the efficiency of audience measurement by reducing the computing resources that would be used to repeatedly rebuild an age prediction model to obtain a desired accuracy of the age prediction over time.

An audience measurement entity (AME) measures the composition and size of audiences consuming media to produce ratings. Ratings are used by advertisers and/or marketers to purchase advertising space and/or design advertising campaigns. Additionally, media producers and/or distributors use the ratings to determine how to set prices for advertising space and/or to make programming decisions. As increasing numbers of audience members use computers (e.g., desktop computers, laptop computers, etc.), portable devices (e.g., tablets, smartphones, etc.), gaming consoles (e.g., Xbox One®, Playstation® 4, etc.) and/or online media presentation devices (e.g., Google Chromecast, Roku® Streaming Stick®, etc.) (sometimes collectively referred to herein as "computing devices") to access media, advertisers and/or marketers are interested in accurately calculated ratings (e.g., online campaign ratings, etc.) for media accessed on these devices.

To measure audiences on computing devices, an AME may use instructions (e.g., Java, java script, or any other computer language or script) embedded in media as describe below in connection with FIG. 6 to collect information indicating when audience members access media on computing devices. Additionally, one or more user and/or device identifiers (e.g., an international mobile equipment identity (IMEI), a mobile equipment identifier (MEID), a media access control (MAC) address, a web browser unique identifier (e.g., a cookie), an app store identifier, an open source unique device identifier (OpenUDID), an open device identification number (ODIN), a login identifier, a username, an email address, user agent data, third-party service identifiers, web storage data, document object model (DOM) storage data, local shared objects, an automobile vehicle identification number (VIN), etc.) located on a computing device allow a partnered database proprietor (e.g., Facebook, Twitter, Google, Yahoo!, MSN, Apple, Experian, etc.) to identify demographic information (e.g., age, gender, geographic location, race, income level, education level, religion, etc.) for the audience member of the computing device collected via a user registration process. For example, an audience member may be accessing an episode of "Boardwalk Empire" made available by a media streaming service (e.g. via a website, via an app, etc.). In that instance, in response to instructions executing within the browser or the app, a user/device identifier stored on the computing device is sent to the AME and/or a partner database proprietor to associate the instance of media exposure (e.g., an impression) to corresponding demographic data of the audience member. The database proprietor can then send logged demographic impression data to the AME for use by the AME in generating, for example, media ratings and/or other audience measures. In some examples, the partner database proprietor does not provide individualized demographic data (e.g., user-level demographics) in association with logged impressions. Instead, in some examples, the partnered database proprietor provides aggregate demographic impression data (sometime referred to herein as "aggregate census data"). For example, the aggregate demographic impression data provided by the partner database proprietor may state that a thousand males, ages 18-24, watched the episode of "Boardwalk Empire" in the last seven days via computing devices. The aggregate demographic data from the partner database proprietor does not identify individual persons (e.g., is not user-level data) associated with individual impressions. In some examples, the database proprietor provides anonymized user-level data (e.g., user-level data with personally identifiable information removed) and/or a subset of anonymized user-level data (e.g., gender, demographic bucket, activity metrics, race/ethnicity, etc.) to the AME. In this manner, the database proprietor protects the privacies of its subscribers/users by not revealing their identities to the AME.

The AME uses this census data to calculate ratings and/or other audience measures for corresponding media. However, during the process of registering with the database proprietor, a subscriber may lie or may otherwise be inaccurate about the subscriber's age information (e.g., age, birth date, etc.). For example, a potential subscriber below a required age (e.g., thirteen, eighteen, twenty-one, etc.) may be prevented from registering with the database proprietor unless the potential subscriber enters a false, but eligible, birth date. Often in such examples, the subscriber does not correct the provided age even after the user's true age is above the required age. As such, impressions collected by a database proprietor for such subscribers will potentially be attributed to the wrong age-based demographic group. For example, if a ten-year old person, during the registration process, represents that he a thirteen years old, the impression data associated with that subscriber will be misattributed to a thirteen-year old person instead of a ten-year old person.

The effect of large-scale misattribution error may create measurement bias error by incorrectly representing the demographic distribution of impressions across a large audience and, therefore, misrepresenting the audience demographics of impressions collected for advertisements and/or other media to which exposure is monitored by the AME. For example, when subscribers initially provide inaccurate age information at registration (e.g., report that they are older than they are, etc.), measured audience demographics may be skewed older than the actual audience demographics. For example, a misattribution error may cause an impression that should be assigned to a certain demographic bucket to be assigned to a different demographic bucket. For example, if the actual age of a subscriber is twenty-two (e.g., in an ages 19-24 demographic bucket), but the reported age of the subscriber is twenty-five (e.g., in an ages 25-34 demographic bucket), the misattribution error would cause an impression corresponding to that subscriber to be assigned to the wrong demographic bucket (e.g., the ages 25-34 demographic bucket instead of the ages 19-24 demographic bucket).

To correct impression data for age-based demographic group misattribution errors, the AME uses an age prediction model to predict the real age of a database proprietor subscriber. The age prediction model uses activity metrics (e.g., frequency of login, type of computing device used to login, number of connections (e.g., friends, contacts, etc.), privacy settings, etc.) of database proprietor subscribers to assign an age probability density function (PDF) to the subscribers of the database proprietor. In some examples, through generating the age prediction model, sets of age PDFs are defined by the AME. The age PDFs define probabilities that the real age of a subscriber is within certain demographic buckets (e.g., age-range buckets). For example, an age PDF may state that the probability that the subscriber is in the 2-7 year-old demographic bucket is 0%, the probability that the subscriber is in the 8-12 year-old demographic bucket is 0%, the probability that the subscriber is in the 13-17 year-old demographic bucket is 7%, the probability that the subscriber is in the 18-24 year-old demographic bucket is 18%, the probability that the subscriber is in the 25-34 year-old demographic bucket is 63%, the probability that the subscriber is in the 35-44 year-old demographic bucket is 11%, the probability that the subscriber is in the 45-54 year-old demographic bucket is 1%, the probability that the subscriber is in the 55-64 year-old demographic bucket is 0%, and the probability that the subscriber is in the 65+ year-old demographic bucket is 0%.

The predicted age of the subscriber predicted by the age prediction model is used as part of the demographic data that is attributed to the impression. However, the predictive value of the age prediction model degrades over time as subscriber behaviors (e.g., as measured by subscriber activity metrics) on which the age prediction model is based change over time. For example, an age prediction model can be developed on day d=0, based on subscriber behaviors that are true as of day d=0 for different age groups. As subscriber behaviors change for a particular age group over time, the same age prediction model will generate inaccurate results when used at a later time. For example, at day d=0, a typical 21-24 year-old male may log into Internet services via a mobile phone for 30% of his total logins. However, at day d=183 (6 months), 21-24 year old males might log in to Internet services using mobile phones for 50% of total logins. As such, the age prediction model generated at day d=0 based on a device type criterion will generate inaccurate results when used on day d=183 due to how log in behaviors have generally changed for subscribers in the 21-24 year-old male age-based demographic group. To counteract the degradation of the age prediction model's predictive value, the AME may, from time to time, regenerate the model. However, generating the age prediction model requires considerable resources (e.g., time, processing power, bandwidth, memory usage, etc.). Between the time the age prediction model is generated and the time that the age prediction model is used to predict age, the likelihood that some age predictions (e.g., the terminal node assignments) made by the age prediction model may be inaccurate increases over time.

As disclosed below, to increase accuracies of ages attributed to impressions between the time the age prediction model is generated and the time that the age prediction will be regenerated, the AME and/or the database proprietor predicts the ages of the subscribers of a database subscriber when the age prediction model is initially generated. The age predictions are stored in an age-cache with, for example, a user identifier (UID), an age PDF assigned by the age prediction model, and the date the prediction was made. A UID is used by the database proprietor to identify user activity. For example, a UID may be a device/user identifier, a user name, an alphanumeric code randomly generated when the user registers, an anonymized identifier, an email address, etc. In some examples, the AME and/or the database proprietor, to protect subscriber privacy, do not store activity metrics on which the age prediction is based in the age-cache.

When impression data corresponding to a subscriber is received, instead of generating a new age PDF through the age prediction model, the predicted age PDF for that subscriber is retrieved from the age-cache and is probabilistically aged. That is, the age PDF is adjusted to account for the probability of the subscriber aging into a new demographic bucket between the date that the age prediction model was used and the date the impression was logged. The adjusted age PDF is then attributed to the corresponding impression.

The AME may, from time to time, still regenerate the age prediction model. However, the time between regenerating the age prediction model may be extended because the degradation of the model has been ameliorated by probabilistically aging the predicted age PDFs. In such a manner, computing resources are conserved by decreasing the number of times the age prediction model needs to be generated to determine acceptably accurate ages. In some examples, upon regenerating the age prediction model, the AME and/or database proprietor may use the age prediction model to assign predicted age PDFs to the subscribers of the database proprietor. In some examples, the AME and/or database proprietor may assign age PDFs to all of the subscribers after generating an age prediction model. In some examples, to conserve processing resources, the AME and/or database proprietor may use the age prediction model to assign predicted age PDFs to subscribers that have registered with the database proprietor since the last age prediction model was generated (e.g., new subscribers).

Disclosed example methods correct for deterioration of a demographic model to associate demographic information with media impression information. Some example methods include collecting, at a processor at an audience measurement entity, messages indicating first impressions of a media item delivered to devices via the Internet. In some examples, the messages identify the media item presented at the devices. Some example methods include receiving, at the processor at the audience measurement entity, first demographic information describing first numbers of impressions of the media item and first numbers of audience members attributed to respective demographic groups by a database proprietor. In some example methods, the first numbers of the impressions and the first numbers of audience members correspond to the first impressions of the media. Some disclosed example methods include estimating first ages of the audience members based on the first demographic information, estimating second ages of the audience members based on the first demographic information, and estimating a third age of an audience member who is not included in the audience members from the database proprietor. In some example methods, the first ages correspond to a first time, the second ages and the third age correspond to a second time after the first time. Disclosed example methods include estimating a corrected age of the audience member at the second time. In some example methods, the estimating the corrected age includes applying a window function to the second ages to determine a distribution of ages based on the third age of the audience member as a mean of the distribution, multiplying window values of the second ages by respective ones of the first ages to determine corrected first age components, summing the corrected first age components and dividing a total of the corrected first age components by a sum of the window values to determine an estimated age of the audience member at the first time, and determining the corrected age of the audience member at the second time based on the estimated age of the audience member at the first time and a time difference between the first and second times. Disclosed example methods also include determining ratings information for the media by attributing impressions and audience counts to the media using the corrected age of the audience member instead of the third age.

In some example methods, the window function includes a probability density function based on a Gaussian distribution. In some examples, the estimating of the first ages includes determining a predicted age probability density function. In some examples, the estimating of the second ages includes applying an aging factor to an age bucket in the predicted age probability density function. Some disclose example methods further include selecting the audience members from a larger set of audience members based on the second ages being within an age range. In some examples, the age range is based on the third age.

Some disclosed example methods further include transmitting audience measurement entity identifiers to the devices in response to at least a portion of the messages. In some examples, the estimating of the third age is in response to determining, based on the audience member not being associated with an audience measurement entity identifier, that the audience member has not been previously identified. Some disclosed example methods further include sending re-direct messages in response to at least a portion of the messages. In some examples, the re-direct messages cause at least a portion of the devices to send third messages to the database proprietor and the first demographic information is received based on the third messages.

Disclosed example apparatus to associate demographic information with media impressions and audience using a deteriorated demographic model include a first impressions collector, a second impressions collector, an age predictor, a model corrector, and a ratings determiner. In some disclosed examples, the first impressions collector collects messages indicating first impressions of a media item delivered to devices via the Internet. In some examples, the messages identify the media item presented at the devices. In some disclosed example apparatus, the second impressions collector receives first demographic information describing first numbers of impressions of the media item and first numbers of audience members attributed to respective demographic groups by a database proprietor. In some examples, the first numbers of the impressions and the first numbers of audience members corresponding to the first impressions of the media. In some disclosed example apparatus, the age predictor to estimates first ages of the audience members based on the first demographic information, estimates second ages of the audience members based on the first demographic information, and estimates a third age of an audience member who is not included in the audience members from the database proprietor. In some examples, the first ages correspond to a first time and the second ages and the third age correspond to a second time after the first time. In some disclosed examples, the model corrector applies a window function to the second ages to determine a distribution of ages based on the third age of the audience member as a mean of the distribution, multiplies window values of the second ages by respective ones of the first ages to determine corrected first age components, divides a sum of the corrected first age components by a sum of the window values to determine an estimated age of the audience member at the first time, and determines the corrected age of the audience member at the second time based on the estimated age of the audience member at the first time and a time difference between the first and second times. In some disclosed apparatus, the ratings determiner determines ratings information for the media by attributing impressions and audience counts to the media using the corrected age of the audience member instead of the third age.

In some examples, the model corrector applies the window function by applying a probability density function based on a Gaussian distribution. In some example apparatus, the age predictor is to estimate the first ages by determining a predicted age probability density function. In some examples, the age predictor is to estimate the second ages by applying an aging factor to an age bucket in the predicted age probability density function.

In some disclosed example apparatus, the model corrector selects the audience members from a larger set of audience members based on the second ages being within an age range, the age range being based on the third age. In some disclosed examples, the first impressions collector transmits audience measurement entity identifiers to the devices in response to at least a portion of the messages. In some examples, the age predictor estimates of the third age in response to determining, based on the audience member not being associated with an audience measurement entity identifier, that the audience member has not been previously identified.

In some disclosed example apparatus, the first impressions collector sends re-direct messages in response to at least a portion of the messages, the re-direct messages to cause at least a portion of the devices to send third messages to the database proprietor, the first demographic information being received based on the third messages.

FIG. 1 illustrates an example system 100 to collect impression data 102 of media presented at computing devices 104 (e.g., desktop computers, laptop computers, tablets, smartphones, gaming consoles, Google Chromecast, Roku® Streaming Stick®, etc.) and to produce aggregate age-corrected demographic impression data 106 to be used by an audience measurement entity (AME) 108. In the illustrated example, the impression data 102 is collected by a database proprietor 110 (e.g., Facebook, Twitter, Google, Yahoo!, MSN, Apple, Experian, etc.). In some examples, the impression data 102 and/or separate impression data is also collected by the AME 108. In some examples, the aggregate demographic impressions 106 are used by the AME 108 to generate ratings for media accessed at computing devices (e.g., the computing device 104.)

In the illustrated example, after media is accessed on the computing device 104, the computing device 104 reports the impression data 102 to the database proprietor 110. In some examples, the computing device 104 reports impression data 102 for accessed media based on instructions embedded in the media that instruct the computing device 104 (e.g., instruct a web browser or an app in the computing device 104) to send impression data 102 to the database proprietor 110. The example impression data 102 includes an impression request 112 and a device/user identifier 114. The example impression request 112 includes a media identifier (e.g., an identifier that can be used to identify content, an advertisement, and/or any other media) corresponding to the media accessed on the computing device 104. In some examples, the AME 108 modifies and/or encodes the media identifiers so the database proprietor 110 cannot identify the media. In some examples, the impression request 112 also includes a site identifier (e.g., a URL) of a website (e.g., YouTube.com, ABC.com, Hulu.com, etc.) that served the media to the computing device 104 and/or a host website ID (e.g., sbnation.com) of the website that displays or presents the media. In some examples, the impression request 112 includes an impression identifier that may be used to uniquely identify the impression request. In some examples, the device/user identifier 114 is a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 datastore, a vehicle identification number (VIN) and/or any other identifier that the database proprietor 110 stores in association with demographic information about subscribers corresponding to the computing devices 104. In some examples, the database proprietor 110 uses the device/user identifier 114 to determine if the user of the computing device 104 is a subscriber of the database proprietor 110.

In the illustrated example of FIG. 1, the database proprietor 110 includes an example impression records database 116, an example age-corrected demographic impression records database 118, an example impression handler 120, an example subscriber accounts database 122, an example age corrector 124, and an example demographic impression aggregator 126. The example impression records database 116 stores the impression data 102 received from the computing device 104. The example age-corrected demographic impression records database 118 stores age-corrected impression data generated by the example impression handler 120. In some examples, the impression records database 116 and the example age-corrected impression records database 118 may be the same database.

In the illustrated example, the impression handler 120 generates demographic impression data by matching demographic information from the subscriber accounts database 122 to the impression data 102. In the illustrated example, the impression handler 120 uses the user/device identifier 114 to determine if the impression data 102 is associated with a subscriber corresponding to an account in the subscriber accounts database 122. In some examples, a value (e.g., a user/device identifier) matching the user/device identifier 114 is stored in a corresponding subscriber account record in the subscriber accounts database 122. In some examples, the impression handler 120 may store and/or otherwise access an intermediate table that associates the user/device identifiers 114 with identifiers used to index subscribers (e.g., a subscriber identifier 130) in the subscriber accounts database 122. For example, the impression handler 120 may look up on an intermediate table a cookie value of a cookie used as a user/device identifier 114 to determine the subscriber identifier 130. In some examples, if the database proprietor 110 cannot find a match for the user/device identifier 114 and a user/device identifier in the subscriber accounts database 122, the corresponding impression data 102 is not processed further. The example impression handler 120 retrieves demographic information corresponding to the subscriber identifier 130 from the subscriber accounts database 122.

In the illustrated example, the example impression handler 120 sends an age-correction request 128 to the example age corrector 124. In the illustrated example, the age-correction request 128 includes a user identifier 130 (UID) (e.g., the user/device identifier 114, the subscriber identifier, etc.) and an impression date 132. The example impression date 132 is a date corresponding to when the impression data 102 was generated by the computing device 104 (e.g. included with the impression data 102 when the impression data is sent to the database proprietor 110). Based on the UID 130 and the impression date 132, the example age corrector 124 generates an age-corrected probability density function (PDF) 134. In some examples, the age-corrected PDF 134 define probabilities that the real age of the subscriber corresponding to the subscriber identifier 130 is within certain demographic buckets (e.g., demographic groups defined by age ranges). For example, the age-corrected PDF 134 may indicate that the probability of the subscriber being in the 18-21 age range is 11.6%, the probability of the subscriber being in the 22-27 age range is 44.5%, the probability of the subscriber being in the 28-33 age range is 36.7%, and the probability of the subscriber being in the 34-40 age range is 7.2%.

In some examples, the age corrector 124 generates and/or uses an age prediction model to estimate ages (or age ranges) of subscribers. The example age prediction model is trained and/or calibrated from time-to-time, but is not constantly calibrated for accuracy. As a result, over time the age prediction model used by the age corrector 124 becomes outdated and the accuracy of the age prediction model is reduced. The example age corrector 124 performs corrections for time-based deterioration of age prediction model(s) used to predict ages of subscribers.

In the illustrated example, the impression handler 120 generates a demographic impression by attributing the demographic data (e.g., without the subscriber-reported age) retrieved from the subscriber accounts database 122 and the age-corrected PDF 134 to the impression data 102. The example impression handler 120 stores the demographic impressions in the example age-corrected demographic impression records database 118.

The example demographic impression aggregator 126 creates aggregate demographic impressions 106 using the demographic impressions stored in the example age-corrected demographic impression database 118. By providing aggregate demographic impressions 106, the database proprietor 110 protects the privacies of its subscribers by not revealing their identities or subscriber-level media access activities, to the AME 108. In some examples, the demographic impressions are aggregated by media. For example, the demographic impression aggregator 126 may create aggregate demographic impressions 106 for season two, episode one of the television program titled "Boardwalk Empire." In some examples, the demographic impressions are aggregated for a certain time period. For example, the demographic impression aggregator 126 may create aggregate demographic impressions 106 for an advertisement for a food product, such as a "Kellogg's® Eggo® Cinnamon Toast Waffles" commercial, for the past seven days. The example demographic impression aggregator 126 creates aggregate demographic impressions 106 by demographic group (e.g., gender, income level, race/ethnicity, marital status, etc.). For example, the demographic impression aggregator 126 may create aggregate demographic impressions 106 for unmarried males accessing the television program titled "Being Human."

In some examples, the demographic impressions are aggregated as granularly (e.g., aggregated by many demographic categories (e.g., ethnicity, religion, education level, gender, income, etc.)) or as coarsely (e.g., aggregated by only a few demographic categories) as agreed between the database proprietor 110 and the AME 108. For example, the database proprietor 110 and the AME 108 may agree that the database proprietor 110 will provide aggregate demographic impressions 106 for the television program titled "Scandal" categorized by gender, ethnicity, and education level.

To generate the aggregate demographic impressions 106, the demographic impression aggregator 126 aggregates the age-corrected PDF 134 stored in the age-corrected demographic impression records database 118. In some examples, to aggregate the age-corrected PDFs, the demographic impression aggregator 126 sums the age probability value for a corresponding demographic bucket of the demographic impressions being aggregated and divides the summed probability values by the number of demographic impressions being aggregated. In some such examples, the demographic impression aggregator 126 repeats this process for each demographic bucket. In some examples, the demographic impression aggregator 126 generates an aggregate age-corrected PDF in accordance with Equation 1 below.

$$AAP_j = \frac{\sum_{i=0}^{n} ADF_j(i)}{n} \quad \text{Equation 1}$$

In Equation 1 above, $AAP_j$ is the aggregated age probability for demographic bucket j, i is a demographic impression, n is the number of demographic impressions to be included in the aggregate demographic impressions 106, and $ADF_j$ is the age-corrected PDF probability value for demographic bucket j. In some examples, the demographic impression aggregator 126 compiles the aggregated age probabilities ($AAP_j$) for the demographic buckets into the aggregate age-corrected PDF that is included in the aggregate demographic impression 106.

Consider the following example for males that accessed season 1, episode 2 of a television show titled "Being Human" in the last seven days. The example corrected-age distribution functions 134 for demographic impressions A through D are given in table 1 below.

TABLE 1

EXAMPLE AGE-CORRECTED PROBABILITY DENSITY FUNCTIONS CORRESPONDING TO EXAMPLE DEMOGRAPHIC IMPRESSIONS A THROUGH D

| | Age 12-14 | Age 15-17 | Age 18-20 | Age 21-24 | Age 25-29 | Age 30-34 |
|---|---|---|---|---|---|---|
| A | 0.200 | 0.350 | 0.300 | 0.100 | 0.025 | 0.025 |
| B | 0.000 | 0.700 | 0.150 | 0.100 | 0.000 | 0.050 |
| C | 0.000 | 0.000 | 1.000 | 0.000 | 0.000 | 0.000 |
| D | 0.100 | 0.350 | 0.400 | 0.075 | 0.075 | 0.000 |

In the illustrated example, the aggregate age probability for the age range 12-14 demographic bucket is 7.5% ((0.2+0.0+0.0+0.1)/4), the aggregate age probability for the age range 15-17 demographic age bucket is 35% ((0.35+0.7+0.0+0.35)/4), the aggregate age probability for the age range 18-20 demographic age bucket is 46.3% ((0.3+0.15+1.0+0.4)/4), the aggregate age probability for the age range 21-24 demographic age bucket is 6.9% (0.1+0.1+0.0+0.075)/4), the aggregate age probability for the age range 25-29 demographic age bucket is 2.5% (0.025+0.0+0.0+0.075)/4), and the aggregate age probability for the age range 30-34 demographic age bucket is 1.8% ((0.025+0.05+0.0+0.0)/4). Based on the example corrected-age distribution functions in Table 2 above, the aggregate corrected-age PDF attributed to the aggregate demographic impressions 106 corresponding to males that accessed season 1, episode 2 of the television program titled "Being Human" in the last seven days is given in Table 2 below.

TABLE 2

EXAMPLE AGGREGATE AGE-CORRECTED PROBABILITY DENSITY FUNCTION

| Age 12-14 | Age 15-17 | Age 18-20 | Age 21-24 | Age 25-29 | Age 30-34 |
|---|---|---|---|---|---|
| 0.075 | 0.350 | 0.463 | 0.069 | 0.025 | 0.018 |

In the illustrated example, from time to time, the age corrector 124 retrieves subscriber data 136 from the subscriber accounts database 122 in order to predict age PDFs for the subscribers of the database proprietor 110. In some examples, the age corrector 124 retrieves subscriber data 136 after a new prediction model is generated. The example subscriber data 136 includes the example UID 130 and example subscriber activity metrics 138. The example subscriber activity metrics 138 are collected and/or calculated based on subscriber behavior and/or demographic factors. The example subscriber activity metrics 138 include self-reported demographic data and behavioral data of a subscriber of the database proprietor 110. The example subscriber activity metrics 138 include login frequency, mobile login activity, privacy settings, post rate, number of contacts, days since registration, whether a cell phone number has been included in registration information, etc. Using the example UID 130 and example subscriber activity metrics 138, the example age corrector 124 predicts and stores age PDFs for the subscribers corresponding to the retrieved subscriber data 136.

Figure 2:
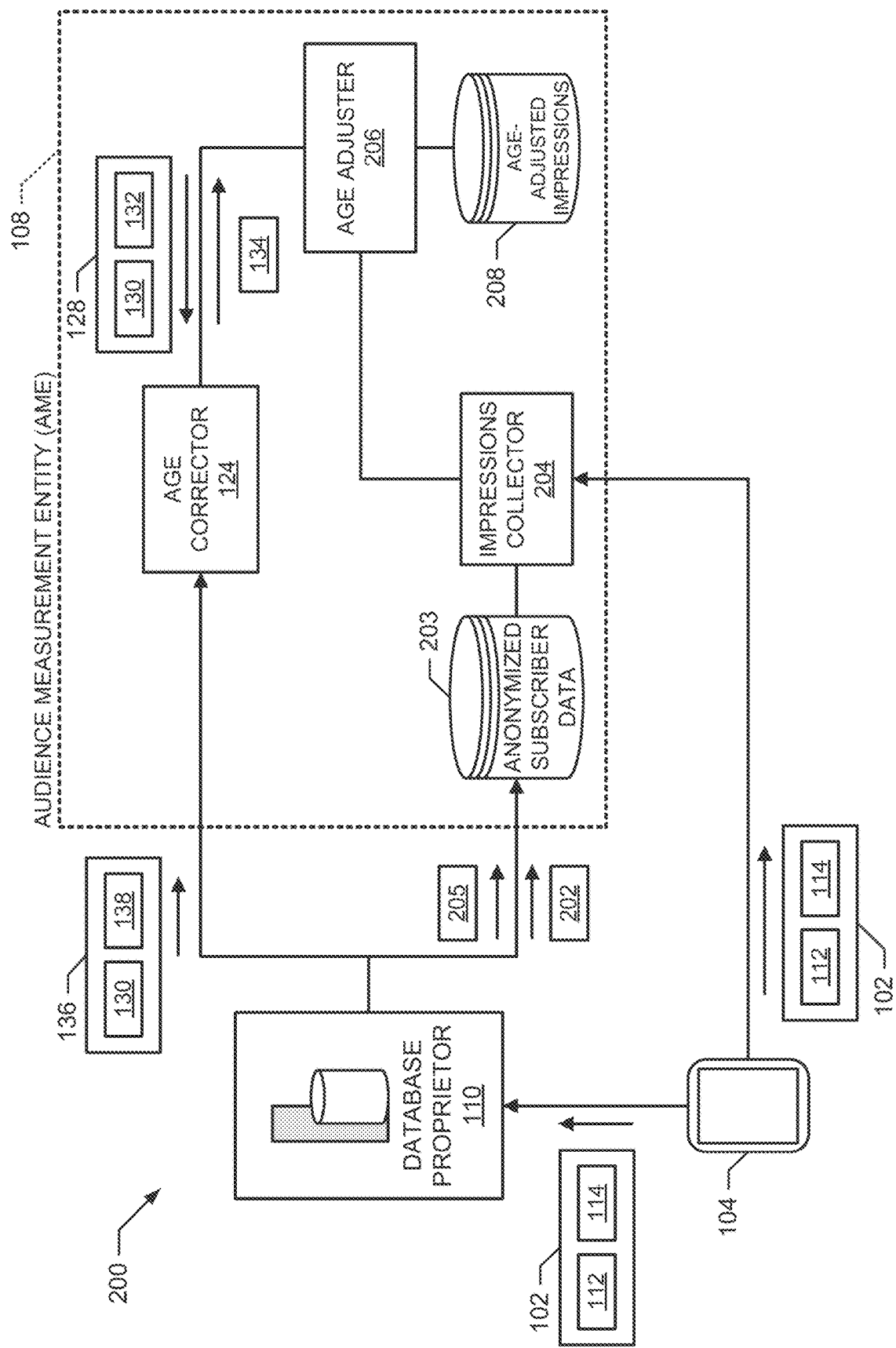
FIG. 2 illustrates an example system to collect impressions of media presented at mobile devices and to correct the impressions for age misattribution at the audience measurement entity.

FIG. 2 illustrates an example system 200 to collect impression data 102 of media accessed at computing devices and to correct the impression data 102 for age misattribution at the AME 108. In the illustrated example, the computing device 104 sends impression data 102 to the AME 108. In some examples, the computing device 104 sends impression data 102 to the database proprietor 110. The example database proprietor 110 sends anonymized subscriber demographic data 202 to the AME 108. The example anonymized subscriber demographic data 202 is demographic data from a subscriber database (e.g., the subscriber database 122 of FIG. 1) that has one or more items of personally identifiable information (e.g., name, home address, email address, date of birth, birthplace, telephone number, national identification number, etc.) removed. In some examples, the anonymized subscriber demographic data 202 also includes an identifier that may be used to match the anonymized subscriber demographic data 202 with impression data 102. In some examples, the database proprietor 110 provides the anonymized subscriber demographic data 202 in response to receiving the impression data 102. In some examples, the database proprietor 110 provides the anonymized subscriber demographic data 202 in response to receiving a request from the AME 108 for the anonymized subscriber demographic data 202. In some examples, the database proprietor 110 provides, from time to time (e.g., at periodic or aperiodic intervals such as every 24 hours or when a particular amount of data has been collected), the anonymized subscriber demographic data 202 in bulk.

In some examples, the database proprietor 110 provides anonymized identifiers with the anonymized subscriber demographic data 202. In some examples, to facilitate correlating the impression data 102 with the anonymized subscriber demographic data 202, the database proprietor 110 sends subscriber correlation data 205 to the AME 108. In some examples, the subscriber correlation data 205 includes the impression identifier included in the impression request 112 and the corresponding anonymized identifier. In some examples, the subscriber correlation data 205 is sent to the AME 108 in response to the impression data 102 being received by the database proprietor 110. In some examples, the database proprietor 110 sends subscriber correlation data 205 to the AME 108 from time to time (e.g., at periodic or aperiodic intervals such as every 24 hours or when a particular amount of impression data 102 has been collected). In such a manner, the anonymized identifier allows the AME 108 to correlate anonymized subscriber demographic data 202 with impression data 102 without allowing the AME 108 to identify the particular subscriber that caused the impression data 102 to be generated.

In the illustrated example, the AME 108 includes an example anonymized subscriber database 203, an example impressions collector 204, an example age corrector 124, an example age adjuster 206, and an example age-adjusted impressions database 208. The example anonymized subscriber database 203 stores the example anonymized subscriber demographic data 202 received from the example database proprietor 110. In the example illustrated in FIG. 2, the impressions collector 204 receives the impression data 102 from the computing device 104. The example impressions collector 204 generates demographic impressions by attributing anonymized subscriber data 202 with impression data 102. In some examples, the impressions collector 204 compares an impression identifier (e.g., the impression identifier 1140 of FIG. 11 below) of the impression request 112 included in the impression data 102 to subscriber correlation data 205 received from the database proprietor 110. In such examples, if a corresponding impression identifier is identified, the impression data 102 is attributed to the anonymized subscriber data 202 corresponding to the anonymized identifier included with the subscriber correlation data 205.

In the illustrated example, the AME 108 receives subscriber data 136 for one or more subscribers of the database proprietor 110. The example subscriber data 136 includes a user identifier 130 and subscriber activity metrics 138. In some examples, the user identifier 130 is the anonymized identifier included in the anonymized subscriber demographic data 202. In some examples, the subscriber data 136 has personally identifiable information removed. Using the user identifier 130 and the example subscriber activity metrics 138, the example age corrector 124 predicts and stores age PDFs for the subscribers corresponding to the anonymized subscriber data 205. For example, the example age adjuster 206 sends an age-correction request 128 to the example age corrector 124. In the illustrated example, the age-correction request 128 includes a user identifier 130 (e.g., an anonymized subscriber identifier, a user/device identifier 114, etc.) and an impression date 132. Based on the user identifier 130 and the impression date 132, the example age corrector 124 generates an age-corrected PDF 134. The example age adjuster 206 attributes the age-corrected PDF 134 to the demographic impression data and stores the demographic impression data in the age-adjusted impression database 208.

Figure 3:
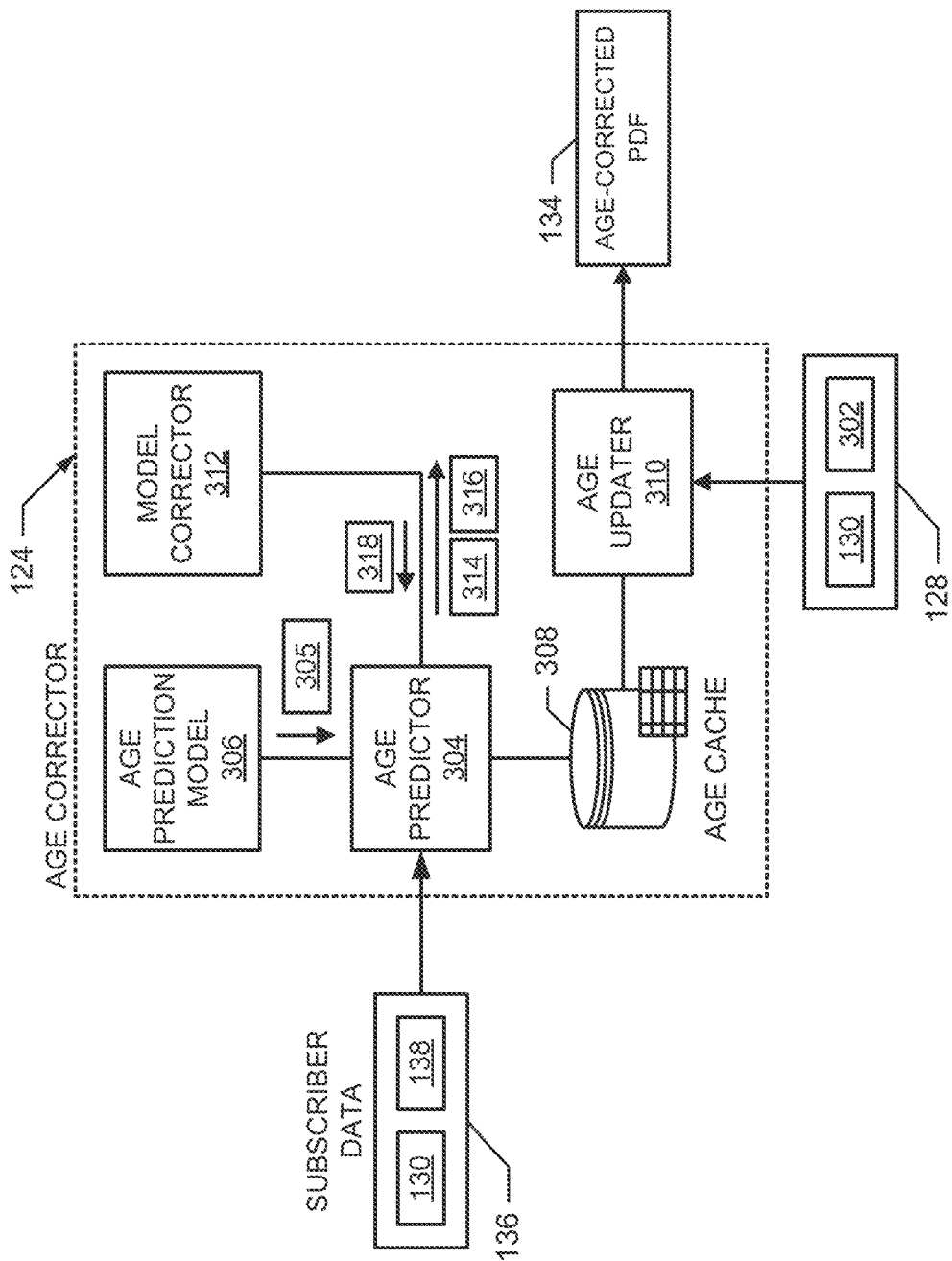
FIG. 3 illustrates an example implementation of the example age corrector of FIGS. 1 and 2 to correct age misattributions in media impressions.

FIG. 3 illustrates an example implementation of the example age corrector 124 of FIGS. 1 and 2 to correct age misattributions in demographic impression data. The example age corrector 124 generates corrected age PDF(s) 134 of subscribers registered with a database proprietor (e.g., the database proprietor 110 of FIGS. 1 and 2) based on subscriber activity metrics (e.g., frequency of login, type of computing device used to login, number of connections (e.g., friends, contacts, etc.)), privacy settings, etc.). In the illustrated example, when the age corrector 124 receives an age request 128, the age corrector 124 generates the corrected age PDF(s) 134. In some examples, the age requests 128 include one or more user identifiers (UIDs) 130 (e.g., a user/device identifier 114, an anonymized identifier, etc.) with corresponding impression dates 302 on which one or more impressions were logged (e.g., by the database proprietor 110) in association with the UID(s) 130. The example corrected age PDF(s) 134 define probabilities that the real age of a subscriber is within certain demographic buckets as of a corresponding impression date 302.

In the illustrated example of FIG. 3, the age corrector 124 includes an example age predictor 304, an example age prediction model 306, an example age cache 308, and an example age updater 310. The example age predictor 304 is structured to predict an age PDF 305 for a subscriber of the database proprietor 110 based on subscriber data 136 (FIG. 1) provided by the database proprietor 110. The age PDFs 305 define probabilities that the real age of the subscriber is within certain demographic buckets on the date the prediction is made (e.g., the date on which the age PDF 305 is determined). The example age predictor 304 stores the predicted age PDF(s) in the age cache 308 with the UID 130 and the date that the age PDF was predicted. In some examples, to protect subscriber privacy, the age predictor 304 does not store the subscriber activity metrics 138 provided with the subscriber data 136 in the age cache 308.

The example age prediction model 306 receives the subscriber activity metrics 138 included with the subscriber data 136 and generates age PDFs. The AME 108 generates the example age prediction model 306 by analyzing subscriber activity metrics of subscribers of the database proprietor 110 that are also enrolled as panelists by the AME 108 (FIG. 1) and the demographic information supplied by the panelist (e.g., when the panelist is enrolled). For example, when a person is enrolled to be a panelist, the person informs the AME 108 of which database proprietors 110 the person subscribes. In that scenario, the AME 108 obtains consent from the enrolled panelists to use the subscriber activity metrics 138 from the database proprietor 110 and the demographic information collected by the AME 108 to contribute to an age prediction model 306. While the self-reported demographic information (e.g., age, etc.) reported to the database proprietor 110 is generally considered inaccurate, the demographic information collected from the panelist (e.g., via a survey, etc.) by the AME 108 is considered highly accurate.

In some examples, the age prediction model 306 is implemented using a classification tree. In some such examples, using the subscriber activity metrics 138 and demographic data of the panelists, a classification tree model is generated comprising intermediate (e.g., decision) nodes and terminal (e.g., prediction) nodes. The intermediate nodes contain test conditions based on the subscriber activity metrics 138 and demographic data and result in branching paths. For example, an intermediate node may branch in one direction if a login frequency (e.g., the number of times a week the subscriber logs into the database proprietor 110) is greater than five times per week, and may branch in another direction if the login frequency is less than or equal to five times per week. The branching paths may either lead to another intermediate node or a terminal node.

In such a scenario, the terminal nodes represent a classification (e.g., a predicted age PDF 305) based on the subscriber activity metrics 138 and demographic data of the panelist. After the classification tree is constructed, the panelists' data is application to the classification tree so that the panelists are classified into the terminal nodes. In some such examples, the age PDF 305 associated with that terminal node is percentage of panelists in the terminal node that fall within a corresponding demographic bucket based on the panelists' real ages. For example, of the panelists in a terminal node, 0% of the panelist may be within the 2-7 year-old demographic bucket, 0% of the panelist may be within the 8-12 year-old demographic bucket, 7% of the panelist may be within the 13-17 year-old demographic bucket, 18% of the panelist may be within the 18-24 year-old demographic bucket, 63% of the panelist may be within the 25-34 year-old demographic bucket, 11% of the panelist may be within the 35-44 year-old demographic bucket, 1% of the panelist may be within the 45-54 year-old demographic bucket, 0% of the panelist may be within the 55-64 year-old demographic bucket, and 0% of the panelist may be within the 65+ year-old demographic bucket. Examples that may be used to generate the age prediction model 306 are disclosed in U.S. patent application Ser. No. 13/209,292, entitled "Methods and Apparatus to Analyze and Adjust Demographic Information," which is incorporated by reference in its entirety.

In some examples, when the age prediction model 306 is generated, a table or a database is created that correlates an age PDF identifier (ID) with an age PDF 305. In some such examples, the age prediction model 306 outputs the age PDF identifier (ID) corresponding to the predicted age PDF 305. In some such examples, the age predictor 304 looks up the age PDF ID in a table and/or database to retrieve the predicted age PDF 305 to store in the age cache 308. In some examples, the age predictor 304 stores the age PDF ID in the age cache 212. Alternatively, in some examples, the age prediction model 306 outputs the predicted age PDF 305, which is stored by the age predictor 304 in the age cache 308.

The example age corrector 124 of FIG. 3 further includes a model corrector 312. As the age prediction model 306 ages between training or calibration sessions, the age prediction model 306 is subject to deterioration (e.g., loss of accuracy). Due to the costs and/or time involved in training an age prediction model, the model may be reused to predict panelist or audience member ages for as long as the projected accuracy of the model is within acceptable limits. Because the age prediction model does not require correction for deterioration at the time the model is trained, the example model corrector 312 performs model correction for audience members who are newly added to the demographic data at a later time.

To correct for model deterioration, the example model corrector 312 of FIG. 3 receives estimated first ages 314 of a group of audience members and estimated second ages 316 of the audience members (e.g., based on demographic information received from a database proprietor). The example age predictor 304 estimates the first ages and the second ages using the age prediction model 306. The first ages are associated with the time at which the age prediction model was trained, and the second ages correspond to a later time at which the age prediction model is being used. At the later time, the age predictor 304 estimates a third age of a new audience member or panelist who is not included in the group of audience members. The third age corresponds to the later time, rather than to the first time.

The example model corrector 312 estimates the age of the new audience member at the first time and then determines the age of the new audience member at the second time using the estimated age at the first time. The model corrector 312 applies a window function (e.g., a Gaussian distribution, also called a normal distribution) to the second ages to determine a distribution of the second ages using the third age (of the new audience member) as a mean of the distribution. As a result, each of the example second ages corresponds to a window value (e.g., a probability density function value) based on the distribution. The example model corrector 312 multiplies the window values of the second ages by respective ones of the first ages to determine corrected first age components. The example model corrector 312 sums the corrected first age components to determine an estimated age of the audience member at the first time.

The example model corrector 312 determines the corrected age of the audience member at the later time based on the estimated age of the audience member at the first time and a time difference between the first and later times. For example, if the later time is 2 years after the first time, the example model corrector 312 adds 2 years to the estimated age of the audience member at the first time. The example model corrector 312 provides a corrected age 318 to the example age predictor 304 to enhance the accuracy of demographics attributed to impressions and/or unique audience counts for media.

FIG. 4 shows an example terminal node table 400 showing age PDFs 305a-305c. In the illustrated example, the age PDFs 305a-305c on the terminal node table 400 are identified by age PDF IDs 404 (APDFID 404). The example age PDFs 305a-305c are divided into demographic bucket probabilities 406a-406m. The demographic bucket probabilities 406a-406m define the probability that the real age of the subscriber falls within the corresponding demographic bucket. When the example age predictor 304 (FIG. 3) uses the example age prediction model 306 (FIG. 3) based on the user subscriber activity metrics 138, the age prediction model 306 outputs one of the age PDFs 305a-305c and/or age PDF IDs 404. For example, if the age prediction model 306 assigns a first subscriber to an age PDF 305b identified by the age PDF ID 404 "A2," the probability that the real age of the first subscribe is 12-14 is 100%. As another example, if the age prediction model 306 assigns a second subscriber to an age PDF 305c identified by the age PDF ID 404 "A3," the probability of the real age of the second subscriber being 2-11 is 6.2%, the probability of the real age of the second subscriber being 12-14 is 32.3%, the probability of the real age of the second subscriber being 15-17 is 60%, and the probability of the real age of the second subscriber being 35-39 is 1.5%.

FIG. 5 illustrates an example data structure 500 to store age PDF(s) (e.g., the age PDF(s) 305 of FIGS. 3 and 4) predicted by age prediction model 306 (FIG. 3). In the illustrated example, the data structure 500 includes an example user identifier 130, an example age PDF identifier (age PDF ID) 404, and an example prediction date 502. The example user identifier 130 is used by the age updater 310 (FIG. 3) to retrieve the age PDF ID 404 and the prediction data 502 when an age request 128 (FIGS. 1 and 2) is received. The example user identifier 130 may be the user/device identifier 114 (FIG. 1), the anonymized identifier, and/or any other identifying value that remains a consistent identifier for a subscriber between the prediction date 502 and the impression date 302 (FIG. 3). The age PDF ID 404 identifies an age PDF that was predicted for the subscriber based on subscriber activity metrics 138 (FIG. 1) on the prediction date 502.

In the illustrated example of FIG. 3, the example age updater 310 retrieves the age PDF ID 404 (FIG. 4) and the prediction date 502 (FIG. 5) from the age cache 308 upon receiving an age request 128. In the illustrated example, the age updater 310 probabilistically ages the age PDF retrieved from the age cache 308 to produce an age-corrected PDF 134. To probabilistically age the age PDF, the age updater 310 calculate aging factor(s) (AF) in accordance with Equation 2 below.

$$AF_j = \frac{NumDays(D_I - D_P)}{NumDays(D_j)} \quad \text{Equation 2}$$

In Equation 2 above, $AF_j$ is an aging factor for the demographic bucket j (e.g., one of the demographic buckets 406a-406m of FIG. 4), $D_I$ is the impression date 302, $D_P$ is the prediction date 502, $NumDays(D_I-D_P)$ is the number of days between the impression date 302 and the prediction date 502, and $NumDays(D_j)$ is the number of days that are spanned by the demographic bucket j. For example, a three-year spanning demographic bucket (e.g., an age 18-20 demographic age bucket, etc.) has 1096 days. For example, if the impression date 302 is Dec. 5, 2014, the prediction date 502 is Apr. 17, 2014, and the span of the demographic bucket is three years, the aging factor would be 0.21 (232/1096) because the number of days between Apr. 17, 2014 and Dec. 5, 2014 is 232. In some examples, where the age ranges of the demographic buckets are the same, the age updater 310 only calculates a single aging factor. For example, if the demographic buckets each span five years (e.g., demographic bucket A spans ages 7-11, demographic bucket B spans ages 12-16, demographic bucket C spans ages 17-21, etc.), the age factors would be identical (e.g., $NumDays(D_j)$ would be 1826)

To probabilistically age the age PDF corresponding to the age PDF ID 404 retrieved from the age cache 308, the age updater 310 applies the aging factor(s) to the age PDF in accordance with Equation 3 below.

$$ACPDF = APDF \times M \quad \text{Equation 3}$$

In Equation 3 above, ACPDF is the age-corrected PDF 134, APDF is a 1×N matric formed by the age PDF retrieved from the age cache 308, where N is the number of demographic buckets in the age PDF, and M is an aging factor matrix calculated in accordance with Equation 4 below.

$$M = \begin{pmatrix} 1-AF_1 & AF_1 & 0 & \cdots & 0 & 0 \\ 0 & 1-AF_2 & AF_2 & \cdots & 0 & 0 \\ \vdots & \vdots & \vdots & \ddots & \vdots & \vdots \\ 0 & 0 & 0 & \cdots & 1-AF_{j-1} & AF_{j-1} \\ 0 & 0 & 0 & \cdots & 0 & 1 \end{pmatrix} \quad \text{Equation 4}$$

In Equation 4 above, $AF_j$ is the aging factor for demographic bucket j.

Consider the following example. An age request 128 is received by the age updater 310 with a UID 130 of "8PR6PYRGQC" and an impression date 302 of Oct. 10, 2014. The age updater 310 retrieves a record from the age cache 308 that has an age PDF ID 404 of "A7" and a prediction date 502 of Jun. 9, 2014. The age PDF ID 404 "A7" corresponds to an age PDF as shown in Table 3 below.

TABLE 3

| EXAMPLE AGE PDF | | | | | |
|---|---|---|---|---|---|
| | Demographic Bucket | | | | |
| | 13-17 | 18-21 | 22-27 | 28-34 | 34-40 |
| Probability | 0% | 15% | 53% | 32% | 0% |

Using Equation 2 above, that age updater 310 calculates the aging factors as shown below in Table 4.

TABLE 4

| EXAMPLE AGING FACTORS BASED ON THE EXAMPLE AGE PDF OF TABLE 3 | | | | | |
|---|---|---|---|---|---|
| | Demographic Bucket | | | | |
| | 1 | 2 | 3 | 4 | 5 |
| Aging Factor | 0.068 | 0.085 | 0.057 | 0.049 | 0.049 |

A matrix, M, applying Equation 4 above to the aging factors in Table 4 above is shown in Equation 5 below.

$$M = \begin{pmatrix} 0.932 & 0.068 & 0 & 0 & 0 \\ 0 & 0.915 & 0.085 & 0 & 0 \\ 0 & 0 & 0.943 & 0.057 & 0 \\ 0 & 0 & 0 & 0.951 & 0.049 \\ 0 & 0 & 0 & 0 & 1 \end{pmatrix} \quad \text{Equation 5}$$

Applying Equation 3 to Equation 5 above and the example age PDF of Table 3 above, the age-corrected PDF 134 determined by the example age updater 310 is shown in Table 5 below.

TABLE 5

EXAMPLE AGE-CORRECTED PDF

| Demographic Bucket | | | | | |
|---|---|---|---|---|---|
| | 13-17 | 18-21 | 22-27 | 28-34 | 34-40 |
| Probability | 0% | 14% | 51% | 33% | 2% |

While an example manner of implementing the example age corrector 124 of FIGS. 1 and/or 2 is illustrated in FIG. 3, one or more of the elements, processes and/or devices illustrated in FIG. 3 may be combined, divided, re-arranged, omitted, eliminated and/or implemented in any other way. Further, the example age predictor 304, the age prediction model 306, the age cache 308, the example age updater 310, the example model corrector 312 and/or, more generally, the example age corrector 124 of FIG. 3 may be implemented by hardware, software, firmware and/or any combination of hardware, software and/or firmware. Thus, for example, any of the example age predictor 304, the age prediction model 306, the age cache 308, the example age updater 310, the example model corrector 312 and/or, more generally, the example age corrector 124 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example age predictor 304, the age prediction model 306, the age cache 308, the example age updater 310, the example model corrector 312, and/or the example age corrector 124 is/are hereby expressly defined to include a tangible computer readable storage device or storage disk such as a memory, a digital versatile disk (DVD), a compact disk (CD), a Blu-ray disk, etc. storing the software and/or firmware. Further still, the example age corrector 124 of FIGS. 1 and 2 may include one or more elements, processes and/or devices in addition to, or instead of, those illustrated in FIG. 3, and/or may include more than one of any or all of the illustrated elements, processes and devices.

Figure 6:
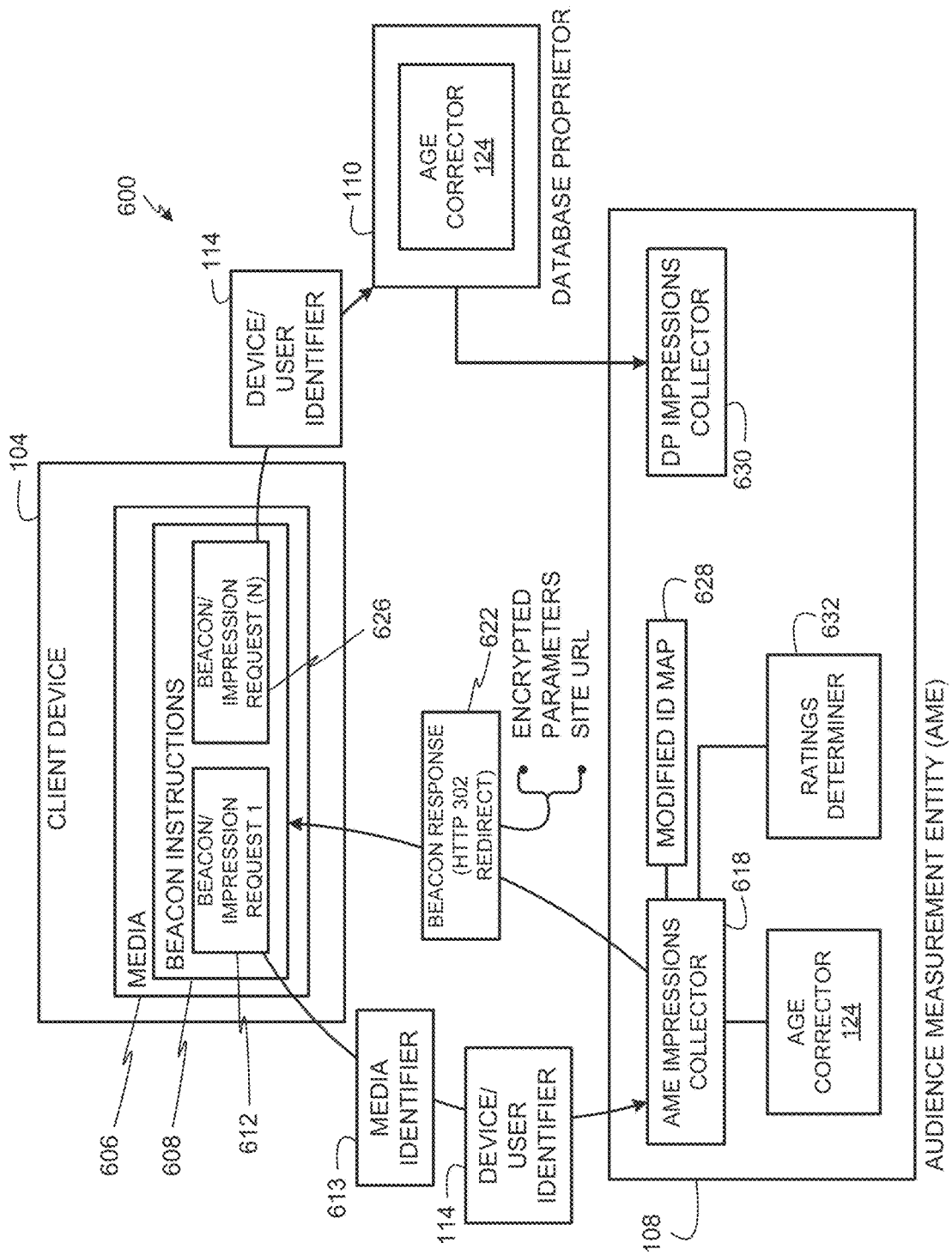
FIG. 6 is an example communication flow diagram of an example manner in which an audience measurement entity and a database proprietor can collect impressions and demographic information based on a client device reporting impressions to the audience measurement entity and the database proprietor.

FIG. 6 illustrates an example communication flow diagram of an example manner in which the AME 108 and the database proprietor 110 can collect impressions and demographic information based on a client device 104 reporting impressions to the AME 108 and the database proprietor 110. Examples disclosed herein to predict age may be used in connection with demographic impressions collected using example techniques described below in connection with FIG. 6. FIG. 6 also shows example age correctors 124. In some examples, the age corrector 124 is part of the database proprietor 110 as shown in FIG. 1. In some examples, the age correct 124 is part of AME 108 as shown in FIG. 2. The example chain of events shown in FIG. 6 occurs when the client device 104 accesses media for which the client device 104 reports an impression to the AME 108 and the database proprietor 110. In some examples, the client device 104 reports impressions for accessed media based on instructions (e.g., beacon instructions) embedded in the media that instruct the client device 104 (e.g., instruct a web browser or an app in the client device 104) to send beacon/impression requests 608 to the AME 108 and/or the database proprietor 110. In such examples, the media having the beacon instructions is referred to as tagged media. In other examples, the client device 104 reports impressions for accessed media based on instructions embedded in apps or web browsers that execute on the client device 104 to send beacon/impression requests 608 to the AME 108, and/or the database proprietor 110 for corresponding media accessed via those apps or web browsers. In any case, the beacon/impression requests 608 include device/user identifiers 114 as described further below to allow the corresponding AME 108 and/or database proprietor 110 to associate demographic information with resulting logged impressions.

In the illustrated example, the client device 104 accesses media 606 that is tagged with beacon instructions 608. The beacon instructions 608 cause the client device 104 to send a beacon/impression request 612 to an AME impressions collector 618 when the client device 104 accesses the media 606. For example, a web browser and/or app of the client device 104 executes the beacon instructions 608 in the media 606 which instruct the browser and/or app to generate and send the beacon/impression request 612. In the illustrated example, the client device 104 sends the beacon/impression request 612 to the AME impression collector 618 using an HTTP (hypertext transfer protocol) request addressed to the URL (uniform resource locator) of the AME impressions collector 618 at, for example, a first internet domain of the AME 108. The beacon/impression request 612 of the illustrated example includes a media identifier 613 (e.g., an identifier that can be used to identify content, an advertisement, and/or any other media) corresponding to the media 606. In some examples, the beacon/impression request 612 also includes a site identifier (e.g., a URL) of the website that served the media 606 to the client device 104 and/or a host website ID (e.g., www.acme.com) of the website that displays or presents the media 606. In the illustrated example, the beacon/impression request 612 includes a device/user identifier 114. In the illustrated example, the device/user identifier 114 that the client device 104 provides in the beacon impression request 612 is an AME ID (e.g., a cookie or other identifier). The AME ID corresponds to an identifier that the AME 108 uses to identify a panelist corresponding to the client device 104. In other examples, the client device 104 may not send the device/user identifier 114 until the client device 104 receives a request for the same from a server of the AME 108 (e.g., in response to, for example, the AME impressions collector 618 receiving the beacon/impression request 612).

In some examples, the device/user identifier 114 may be a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 datastore, a vehicle identification number (VIN) and/or any other identifier that the AME 108 stores in association with demographic information about users of the client devices 104. When the AME 108 receives the device/user identifier 114, the AME 108 can obtain demographic information corresponding to a user of the client device 104 based on the device/user identifier 114 that the AME 108 receives from the client device 104. In some examples, the device/user identifier 114 may be encrypted (e.g., hashed) at the client device 104 so that only an intended final recipient of the device/user identifier 114 can decrypt the hashed identifier 114. For example, if the device/user identifier 114 is a cookie that is set in the client device 104 by the AME 108, the device/user identifier 114 can be hashed so that only the AME 108 can decrypt the device/user identifier 114. If the device/user identifier 114 is an IMEI number, the client device 104 can hash the device/user identifier 114 so that only a wireless carrier (e.g., the database proprietor 110) can decrypt the hashed identifier 114 to recover the IMEI for use in accessing demographic information corresponding to the user of the client device 104. By hashing the device/user identifier 114, an intermediate party (e.g., an intermediate server or entity on the Internet) receiving the beacon request cannot directly identify a user of the client device 104.

In response to receiving the beacon/impression request 612, the AME impressions collector 618 logs an impression for the media 606 by storing the media identifier 613 contained in the beacon/impression request 612. In the illustrated example of FIG. 6, the AME impressions collector 618 also uses the device/user identifier 114 in the beacon/impression request 612 to identify AME panelist demographic information corresponding to a panelist of the client device 104. That is, the device/user identifier 114 matches a user ID of a panelist member (e.g., a panelist corresponding to a panelist profile maintained and/or stored by the AME 108). In this manner, the AME impressions collector 618 can associate the logged impression with demographic information of a panelist corresponding to the client device 104.

In some examples, the beacon/impression request 612 may not include the device/user identifier 114 if, for example, the user of the client device 104 is not an AME panelist. In such examples, the AME impressions collector 618 logs impressions regardless of whether the client device 104 provides the device/user identifier 114 in the beacon/ impression request 612 (or in response to a request for the identifier 114). When the client device 104 does not provide the device/user identifier 114, the AME impressions collector 618 will still benefit from logging an impression for the media 606 even though it will not have corresponding demographics. For example, the AME 108 may still use the logged impression to generate a total impressions count and/or a frequency of impressions (e.g., an impressions frequency) for the media 606. Additionally or alternatively, the AME 108 may obtain demographics information from the database proprietor 110 for the logged impression if the client device 104 corresponds to a subscriber of the database proprietor 110.

In the illustrated example of FIG. 6 to compare or supplement panelist demographics (e.g., for accuracy or completeness) of the AME 108 with demographics from one or more database proprietors (e.g., the database proprietor 110), the AME impressions collector 618 returns a beacon response message 622 (e.g., a first beacon response) to the client device 104 including an HTTP "302 Found" re-direct message and a URL of a participating database proprietor 110 at, for example, a second internet domain. In the illustrated example, the HTTP "302 Found" re-direct message in the beacon response 622 instructs the client device 104 to send a second beacon request 626 to the database proprietor 110. In other examples, instead of using an HTTP "302 Found" re-direct message, redirects may be implemented using, for example, an iframe source instruction (e.g., <iframe src=" ">) or any other instruction that can instruct a client device to send a subsequent beacon request (e.g., the second beacon request 626) to a participating database proprietor 110. In the illustrated example, the AME impressions collector 618 determines the database proprietor 110 specified in the beacon response 622 using a rule and/or any other suitable type of selection criteria or process. In some examples, the AME impressions collector 618 determines a particular database proprietor to which to redirect a beacon request based on, for example, empirical data indicative of which database proprietor is most likely to have demographic data for a user corresponding to the device/user identifier 114. In some examples, the beacon instructions 608 include a predefined URL of one or more database proprietors to which the client device 104 should send follow up beacon requests 626. In other examples, the same database proprietor is always identified in the first redirect message (e.g., the beacon response 622).

In some examples, the AME 108 assigns an identifier to the device 104 in response to receiving a first message from the device 104. For example, the AME 108 may send an AME cookie on the device 104 with the beacon response 622. When the device 104 sends subsequent beacon requests 612, the device 104 may include the AME cookie to enable to the AME 108 to identify that the device 104 has already been observed. In some cases, the AME cookie expires after a valid time period of the cookie, after which a new AME cookie is set by the AME 108 in response to a beacon request 612 from the same device 104.

In the illustrated example of FIG. 6, the beacon/impression request 626 may include a device/user identifier 114 that is a database proprietor ID because it is used by the database proprietor 110 to identify a subscriber of the client device 104 when logging an impression. In some instances (e.g., in which the database proprietor 110 has not yet set a database proprietor ID in the client device 104), the beacon/ impression request 626 does not include the device/user identifier 114. In some examples, the database proprietor ID is not sent until the database proprietor 110 requests the same (e.g., in response to the beacon/impression request 626). When the database proprietor 110 receives the device/ user identifier 114, the database proprietor 110 can obtain demographic information corresponding to a user of the client device 104 based on the device/user identifier 114 that the database proprietor 110 receives from the client device 104. In some examples, the device/user identifier 114 may be encrypted (e.g., hashed) at the client device 104 so that only an intended final recipient of the device/user identifier 114 can decrypt the hashed identifier 114. For example, if the device/user identifier 114 is a cookie that is set in the client device 104 by the database proprietor 110, the device/user identifier 114 can be hashed so that only the database proprietor 110 can decrypt the device/user identifier 114. If the device/user identifier 114 is an IMEI number, the client device 104 can hash the device/user identifier 114 so that only a wireless carrier (e.g., the database proprietor 110) can decrypt the hashed identifier 114 to recover the IMEI for use in accessing demographic information corresponding to the user of the client device 104. By hashing the device/user identifier 114, an intermediate party (e.g., an intermediate server or entity on the Internet) receiving the beacon request cannot directly identify a user of the client device 104. For example, if the intended final recipient of the device/user identifier 114 is the database proprietor 110, the AME 108 cannot recover identifier information when the device/user identifier 114 is hashed by the client device 104 for decrypting only by the intended database proprietor 110.

In some examples that use cookies as the device/user identifier 114, when a user deletes a database proprietor cookie from the client device 104, the database proprietor 110 sets the same cookie value in the client device 104 the next time the user logs into a service of the database proprietor 110. In such examples, the cookies used by the database proprietor 110 are registration-based cookies, which facilitate setting the same cookie value after a deletion of the cookie value has occurred on the client device 104. In this manner, the database proprietor 110 can collect impressions for the client device 104 based on the same cookie value over time to generate unique audience (UA) sizes while eliminating or substantially reducing the likelihood that a single unique person will be counted as two or more separate unique audience members.

Although only a single database proprietor 110 is shown in FIG. 6, the impression reporting/collection process of FIG. 6 may be implemented using multiple database proprietors 110. In some such examples, the beacon instructions 608 cause the client device 104 to send beacon/impression requests 626 to numerous database proprietors 110. For example, the beacon instructions 608 may cause the client device 104 to send the beacon/impression requests 626 to the numerous database proprietors 110 in parallel or in daisy chain fashion. In some such examples, the beacon instructions 608 cause the client device 104 to stop sending beacon/impression requests 626 to database proprietors once a database proprietor has recognized the client device 104. In other examples, the beacon instructions 608 cause the client device 104 to send beacon/impression requests 626 to database proprietors 110 so that multiple database proprietors 110 can recognize the client device 104 and log a corresponding impression. In any case, multiple database proprietors 110 are provided the opportunity to log impressions and provide corresponding demographics information if the user of the client device 104 is a subscriber of services of those database proprietors.

In some examples, prior to sending the beacon response 622 to the client device 101, the AME impressions collector 618 replaces site IDs (e.g., URLs) of media provider(s) that served the media 606 with modified site IDs (e.g., substitute site IDs) which are discernable only by the AME 108 to identify the media provider(s). In some examples, the AME impressions collector 618 may also replace a host website ID (e.g., www.acme.com) with a modified host site ID (e.g., a substitute host site ID) which is discernable only by the AME 108 as corresponding to the host website via which the media 606 is presented. In some examples, the AME impressions collector 618 also replaces the media identifier 613 with a modified media identifier 613 corresponding to the media 606. In this way, the media provider of the media 606, the host website that presents the media 606, and/or the media identifier 613 are obscured from the database proprietor 110, but the database proprietor 110 can still log impressions based on the modified values which can later be deciphered by the AME 108 after the AME 108 receives logged impressions from the database proprietor 110. In some examples, the AME impressions collector 618 does not send site IDs, host site IDS, the media identifier 613 or modified versions thereof in the beacon response 622. In such examples, the client device 104 provides the original, non-modified versions of the media identifier 613, site IDs, host IDs, etc. to the database proprietor 110.

In the illustrated example, the AME impression collector 618 maintains a modified ID mapping table 628 that maps original site IDs with modified (or substitute) site IDs, original host site IDs with modified host site IDs, and/or maps modified media identifiers to the media identifiers such as the media identifier 613 to obfuscate or hide such information from database proprietors such as the database proprietor 110. Also in the illustrated example, the AME impressions collector 618 encrypts all of the information received in the beacon/impression request 612 and the modified information to prevent any intercepting parties from decoding the information. The AME impressions collector 618 of the illustrated example sends the encrypted information in the beacon response 622 to the client device 104 so that the client device 104 can send the encrypted information to the database proprietor 110 in the beacon/impression request 626. In the illustrated example, the AME impressions collector 618 uses an encryption that can be decrypted by the database proprietor 110 site specified in the HTTP "302 Found" re-direct message.

From time to time, the impression data collected by the database proprietor 110 is provided to a database proprietor impressions collector 630 of the AME 108 as, for example, batch (e.g., aggregate) data. As discussed above, some impressions logged by the client device 104 to the database proprietor 110 are misattributed by the database proprietor 110 to a wrong subscriber and, thus, to incorrect demographic information. During a data collecting and merging process to combine demographic and impression data from the AME 108 and the database proprietor 110, demographics of impressions logged by the AME 108 for the client device 104 will not correspond to demographics of impressions logged by the database proprietor 110 because the database proprietor 110 has misattributed some impressions to the incorrect demographic information. Examples disclosed herein may be used to determine corrected age-based demographic groups of impression data provided by the database proprietor 110.

The example AME 108 of FIG. 6 further includes a ratings determiner 632. The example ratings determiner 632 generates ratings information for the media by attributing impressions, duration (e.g., viewing or listening minutes), and/or audience counts to demographic groups (e.g., gender and/or age groups). The ratings information generated by the ratings determiner 632 is based on the ages predicted by the age corrector 124, where the ages are corrected for deterioration of an age prediction model.

Additional examples that may be used to implement the beacon instruction processes of FIG. 6 are disclosed in U.S. Pat. No. 8,370,489, entitled "Methods and Apparatus to Determine Impressions Using Distributed Demographic Information," which is hereby incorporated herein by reference in its entirety. In addition, other examples that may be used to implement such beacon instructions are disclosed in U.S. Pat. No. 6,108,637, entitled "Content Display Monitor," which is hereby incorporated herein by reference in its entirety.

In some examples, the database proprietor 110, before providing aggregated demographics to the AME 108, uses the age corrector 124 to correct age-based demographic group misattributions in the impression data. In some examples, the aggregate impressions data includes an aggregate age PDF. In some examples, when the AME 108 receives anonymized user-level impression data and/or demographic data from the database proprietor 110, the AME 108 uses the age corrector 124 to correct age-based demographic group misattributions in the impression data.

Figure 7:
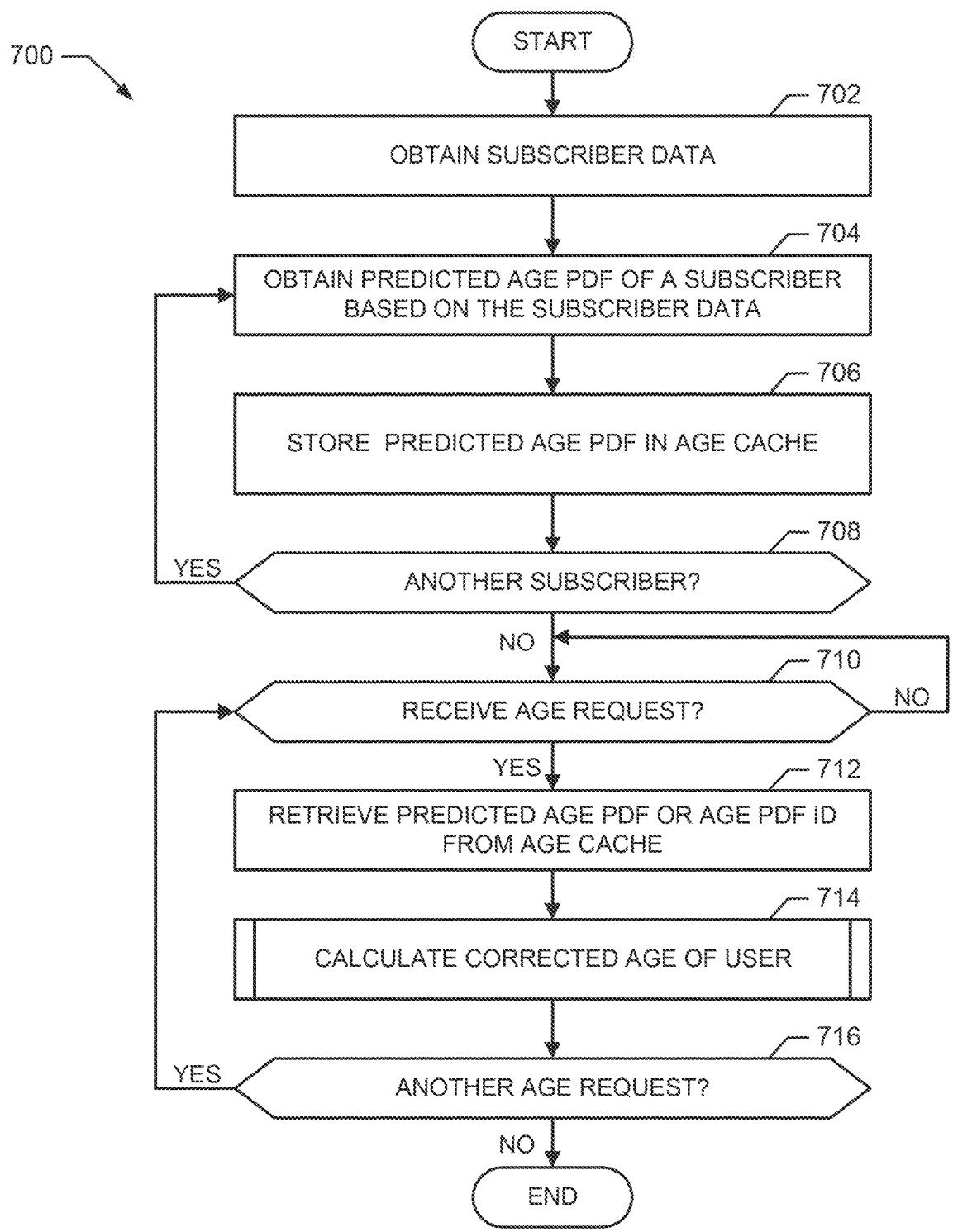
FIG. 7 is a flow diagram representative of example machine readable instructions that may be executed to implement the example age corrector of FIGS. 1, 2, and/or 5 to age misattributions in media impressions.
Figure 8:
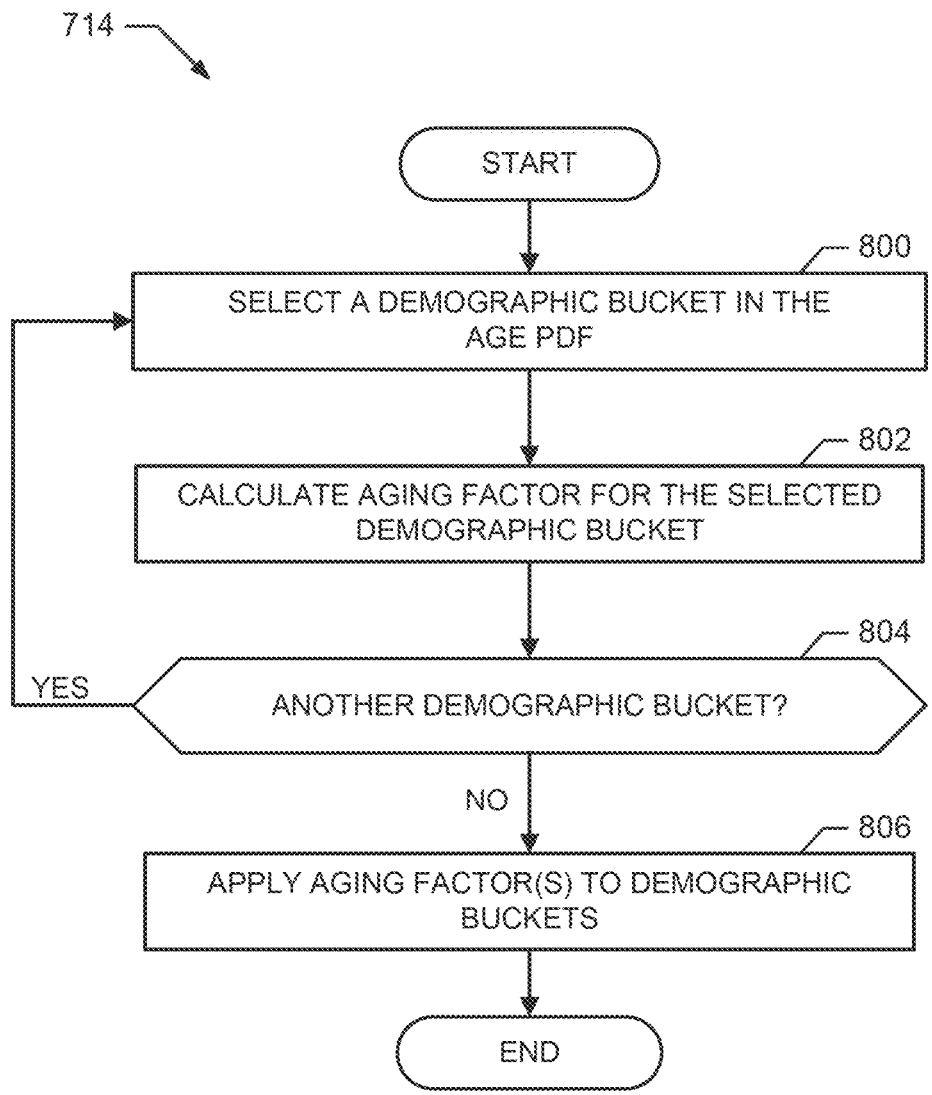
FIG. 8 is a flow diagram representative of example machine readable instructions that may be executed to implement the example age updater of FIG. 5 to probabilistically age a prediction age distribution function.
Figure 9:
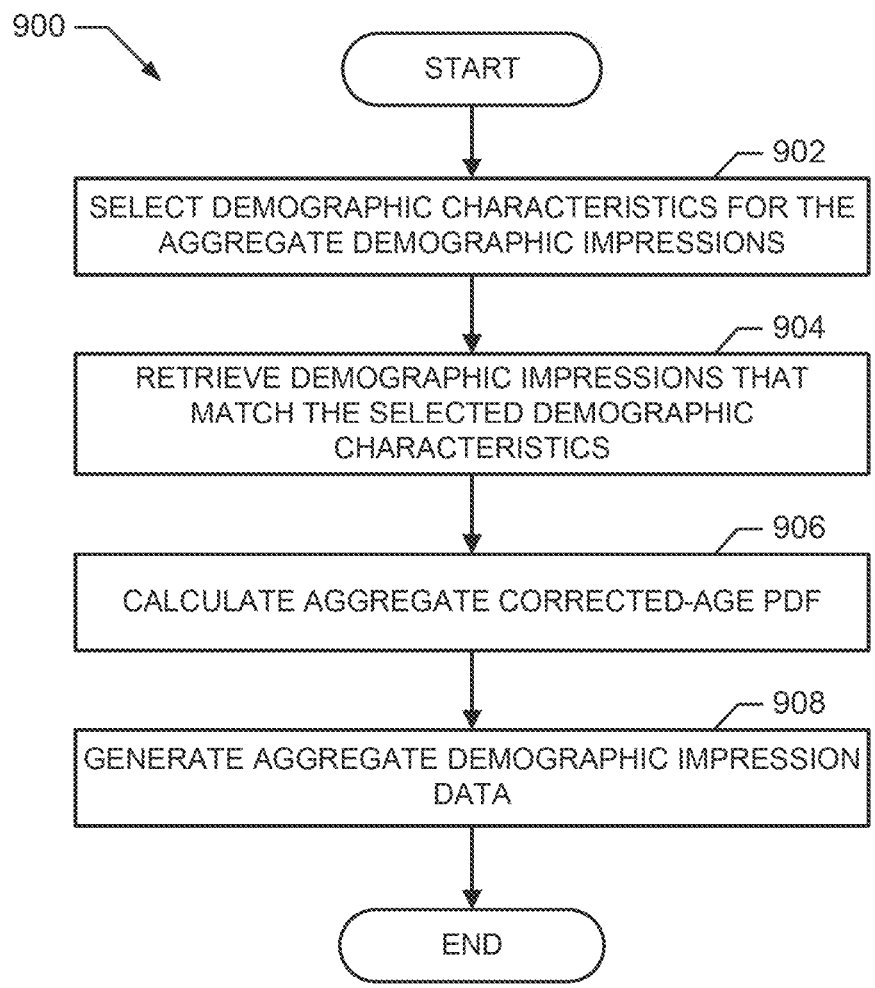
FIG. 9 is a flow diagram representative of example machine readable instructions that may be executed to implement the example demographic impression aggregator of FIG. 1 to aggregate demographic impressions to be sent to the audience measurement entity.

A flowchart representative of example machine readable instructions for implementing the age corrector 124 of FIG. 3 is shown in FIG. 7. A flowchart representative of example machine readable instructions for implementing the age updater 310 of FIG. 3 is shown in FIG. 8. A flowchart representative of example machine readable instructions for implementing the demographic impression aggregator 126 of FIG. 1 is shown in FIG. 9. In this example, the machine readable instructions comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example programs are described with reference to the flowcharts illustrated in FIGS. 7, 8, 9, and/or 13, many other methods of implementing the example age corrector 124, the example age updater 310, the example model corrector 312, and/or the example demographic impression aggregator 126 may alternatively be used. For example, the order of execution of the blocks may be changed, and/or some of the blocks described may be changed, eliminated, or combined.

As mentioned above, the example processes of FIGS. 7, 8, 9, and/or 13 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7, 8, 9, and/or 13 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 7 is a flow diagram of example machine readable instructions 700 that may be executed to implement the data corrector 124 of FIGS. 1, 2, and/or 5 to correct ages associated with demographic impressions associated with subscribers of a database proprietor 110. Initially, at block 702, the age predictor 304 (FIG. 3) obtains subscriber data (e.g., the subscriber data 136 of FIGS. 1, 2, and 3). The example subscriber data 136 includes an identifier (e.g., UID 130 of FIGS. 1, 2, and 3) and subscriber activity metrics (e.g., the subscriber activity metrics 138 of FIGS. 1, 2, and 3) for one or more subscribers of the database proprietor 110. In some examples, the subscriber data 136 is obtained in response to an age prediction model 306 (FIG. 3) being generated so that the age predictor 304 can make age predictions based on the subscriber data 136 soon after the age prediction model 306 is generated. In some examples, the age predictor 304 retrieves subscriber data 136 for a subset of the subscribers of the database proprietor 110. For example, the age predictor 304 may retrieve subscriber data 136 of subscribers that have subscribed to the database proprietor 110 since the age prediction model 306 was last generated.

At block 704, the age predictor 304 obtains an age PDF (e.g., the age PDF 305 of FIG. 3) from the prediction model 306 using the subscriber activity metrics 138. In some examples, using the subscriber activity metrics 138 as inputs into the age prediction model 306, the intermediate nodes of the age prediction model 306 are traversed until the age prediction model 306 reaches a terminal node. In such an example, the terminal node identifies an age PDF (e.g., the age PDF 305 of FIGS. 3 and 4) and/or an age PDF ID (e.g., the age PDF ID 404 of FIGS. 4 and 5). In some examples, the age PDF 305 is identified by the age PDF ID. At block 706, the age predictor 304 stores the predicted age PDF 305 and/or the age PDF ID 404, the UID 130 included in the subscriber data 138, and the date the prediction was made (e.g., the prediction date 502 of FIG. 5) in the age cache 308. At block 708, the age predictor 304 determines whether there is another subscriber (e.g., more subscriber data 136) for which to obtain a predicted age PDF. If there is another subscriber, program control returns to block 704. Otherwise, if there is not another subscriber, program control advances to block 710.

At block 710, the age updater 310 waits until an age request (e.g., the age request 128 of FIGS. 1 and 2) has been received. For example, the age updater 310 may receive the age request 128 from the impression handler 120 (FIG. 1) or the age adjuster 206 (FIG. 2) to determine the age-corrected PDF 134 at a later time (e.g., days, weeks, months, etc.) after the age predictor 304 determines an initial predicted age PDF 305 represented in the age cache 308. If an age request 128 has been received, program control advances to block 712. At block 712, the age updater 310 retrieves a predicted age PDF 305 and/or an age PDF ID 404 and a prediction date 502 from the age cache 308 based on a UID 130 included in the age request 128. At block 714, the age updater 310 calculates an age-corrected PDF 134 (FIGS. 1, 2 and 3). An example process for implementing the operation of block 714 is described below in connection with FIG. 8. At block 716, the age updater 310 determines if there is another age request 128. If there is another age request 128, program control returns to block 710. Otherwise, if there is not another age request 128, the example program 700 ends.

FIG. 8 is a flow diagram of example machine readable instructions 714 that may be executed to implement the age updater 310 of FIG. 3 to calculate an age-corrected PDF 134 (FIGS. 1, 2 and 3) based on a predicted age PDF with a corresponding prediction date 502 (FIG. 5) and an age request 128 (FIGS. 1, 2, and 3) that includes an impression date 302. The example process of FIG. 8 may be used to implement clock 714 of FIG. 7. Initially, at block 800, the age updater 310 selects a demographic bucket from the predicted age PDF for which to calculate an aging factor. For example, if the predicted age PDF (e.g., the predicted age PDFs 305a-305c of FIG. 4) has a 2-11 year-old demographic bucket, a 12-14 year-old demographic bucket, a 15-17 year-old demographic bucket, an 18-20 year-old demographic bucket, a 21-24 year-old demographic bucket, a 25-29 year-old demographic bucket, a 30-34 year-old demographic bucket, a 35-39 year-old demographic bucket, a 40-44 year-old demographic bucket, a 45-49 year-old demographic bucket, a 50-54 year-old demographic bucket, a 55-64 year-old demographic bucket, and a 65+ year-old demographic bucket, the age updater 310 may select the 2-11 year-old demographic bucket. At block 802, the age updater 310 calculates an aging factor for the selected demographic bucket. In some examples, the aging factors are calculated in accordance with Equation 2 above. For example, if the impression date 302 is Sep. 25, 2014, the prediction date 502 is Mar. 2, 2014, and the span of the selected demographic bucket is five years (e.g., an ages 2-6 year-old demographic bucket, an ages 7-11 year-old demographic bucket, etc.), the aging factor is 0.114 (208/1826) because 208 is the number of days between Sep. 25, 2014, and Mar. 2, 2014, and 1826 is the number of days in five years.

At block 804, the age updater 310 determines whether another aging factor is to be calculated for another demographic bucket. For example, another aging factor is to be calculated if one or more demographic buckets of a predicted age PDF have not had corresponding aging factors calculated. If another aging factor is to be calculated for another demographic bucket, program control returns to block 800. Otherwise, if another aging factor is not to be calculated for another demographic bucket, program control advances to block 806. At block 806, the age updater 310 applies the aging factor(s) calculated at block 802 to the predicted age PDF. For example, the age updater 310 applies aging factors to the predicted age PDF to generate the age-corrected PDF 134 (FIGS. 1, 2, and 3). In some examples, the aging factors are applied to the predicted age PDF in accordance with Equation 3 and Equation 4 above. Example program 714 then ends.

FIG. 9 is a flow diagram of example machine readable instructions 900 that may be executed to implement the demographic impression aggregator 126 of FIG. 1 to calculate aggregated age-corrected PDFs to include with aggregate demographic impressions 106 (FIG. 1). The example process of FIG. 9 may be used when aggregate demographic impressions 106 are to be sent to the AME 108. Initially, at block 902, the demographic impression aggregator 126 selects characteristics (e.g., gender, marital status, media, device type, location, etc.) to include and/or exclude to generate aggregate demographic impressions 106. For example, the demographic impression aggregator 126 may select "males, 'Ricky and Morty', New England" (e.g., a gender, a media presentation, and a geographical region) as the characteristics to use to aggregate the demographic impressions. In some examples, the selected characteristics are based on agreements between the AME 108 (FIG. 1) and the database proprietor 110 (FIG. 1). In some examples, the selected characteristics are based on requests for aggregate demographic data 106 by the AME 108. At block 904, the demographic impression aggregator 126 retrieves the demographic impressions corresponding to the characteristics selected at block 902 from the impression database 116.

At block 906, the demographic impression aggregator 126 calculates an aggregate age-corrected PDF based on the age-corrected PDFs corresponding to the demographic impressions retrieved at block 904. In some examples, to calculate an aggregate age-corrected PDF, the demographic impression aggregator 126 averages the probabilities for each demographic bucket. For example, if the probabilities associated with the 18-20 year-old demographic bucket for predicted age PDFs to be aggregated are 13%, 20%, 5% and 10%, the aggregate probability for the 18-20 year-old demographic bucket would be 12% ((13%+20%+5%+10%)/4). In some examples, the aggregate age-corrected PDF is calculated in accordance with Equation 1 above. At block 908, the demographic impression aggregator 126 generates the aggregate demographic impression data 106. In some examples, the demographic impression aggregator 126 generates the aggregate demographic impression data 106 by associating the aggregate age-corrected PDF calculated at block 906 with a count of the demographic impressions retrieved at block 904. Example program 900 then ends.

Figure 10:
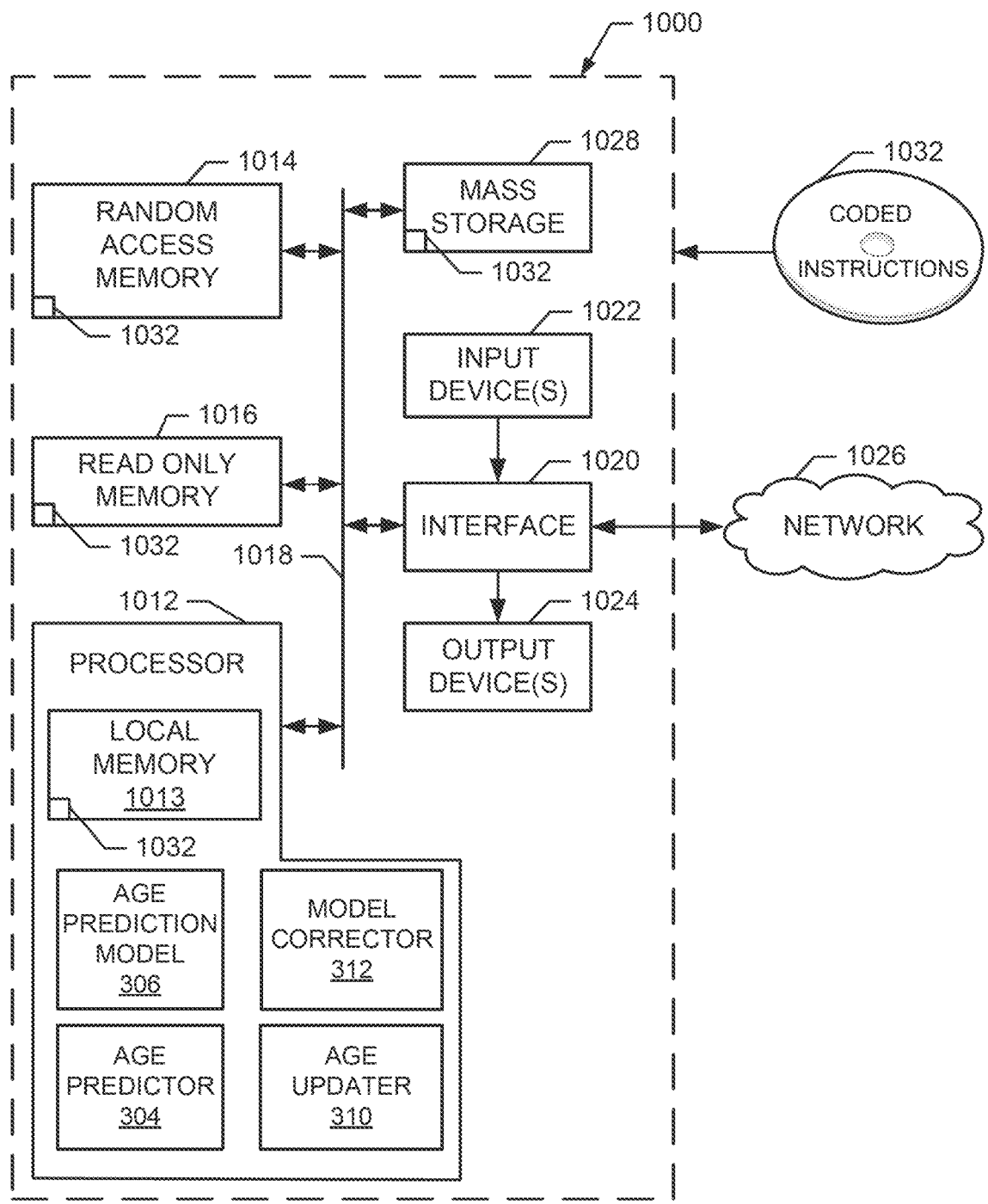
FIG. 10 is a block diagram of an example processor system structured to execute the example machine readable instructions represented by FIGS. 7, 8, 9 and/or 13 to implement the example age corrector of FIGS. 1, 2, 5, and/or 6.

FIG. 10 is a block diagram of an example processor platform 1100 structured to execute the instructions of FIGS. 7, 8, 9, and/or 13 to implement the age corrector 124, the impression handler 120, the demographic impression aggregator 126, the impressions collectors 204, the age adjuster 206, the age predictor 304, the age prediction model 306, the age cache 308, the age updater 310, and/or the model corrector 312 of FIGS. 1, 2, 3 and/or 6. By way of example, FIG. 10 shows the age predictor 304 and the age updater 310, but processor platform 1000 may include more of, fewer of, or different ones of the age corrector 124, the impression handler 120, the demographic impression aggregator 126, the impressions collectors 204, the age adjuster 206, the age predictor 304, the age prediction model 306, the age cache 308, the age updater 310, and/or the model corrector 312 of FIGS. 1, 2, 3, and/or 6. The processor platform 1000 can be, for example, a server, a personal computer, a workstation, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

Coded instructions 1032 to implement the machine readable instructions of FIGS. 7, 8, 9, and/or 13 may be stored in the mass storage device 1028, in the volatile memory 1014, in the non-volatile memory 1016, and/or on a removable tangible computer readable storage medium such as a CD or DVD.

Figure 11:
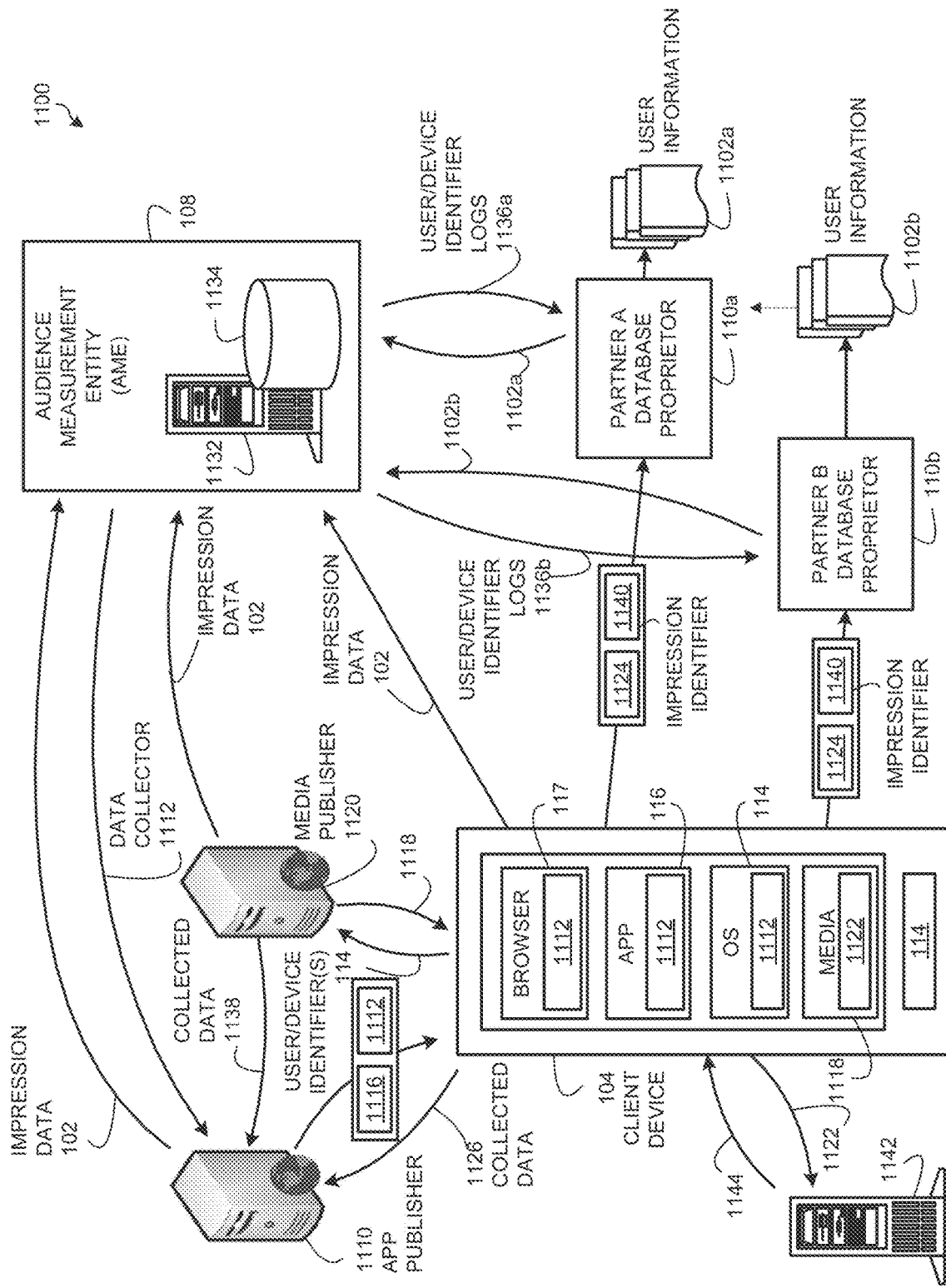
FIG. 11 depicts an example system to collect impressions of media presented on mobile devices and to collect user information from distributed database proprietors for associating with the collected impressions.

FIG. 11 depicts an example system 1100 to collect user information (e.g., user information 1102a, 1102b) from distributed database proprietors 110a, 110b for associating with impressions of media presented at a client device 104. Examples disclosed herein to predict ages may be used in connection with demographic impressions collected using example techniques described below in connection with FIG. 11.

In the illustrated examples, user information 1102a, 1102b or user data includes one or more of demographic data, purchase data, and/or other data indicative of user activities, behaviors, and/or preferences related to information accessed via the Internet, purchases, media accessed on electronic devices, physical locations (e.g., retail or commercial establishments, restaurants, venues, etc.) visited by users, etc. In some examples, user information 1102a, 1102b is stored in the subscriber accounts database 122 of FIG. 1. Examples of FIG. 11 are described in connection with a mobile device, which may be a mobile phone, a mobile communication device, a tablet, a gaming device, a portable media presentation device, an in-vehicle or vehicle-integrated communication system, such as an automobile infotainment system with wireless communication capabilities, etc. However, examples disclosed herein may be implemented in connection with impressions corresponding to mobile and/or non-mobile devices. Example non-mobile devices include internet appliances, smart televisions, internet terminals, computers, or any other device capable of presenting media received via network communications.

In the illustrated example of FIG. 11, to track media impressions on the client device 104, the AME 108 partners with or cooperates with an app publisher 1110 to download and install a data collector 1112 on the client device 104. The app publisher 1110 of the illustrated example may be a software app developer that develops and distributes apps to mobile devices and/or a distributor that receives apps from software app developers and distributes the apps to mobile devices. The data collector 1112 may be included in other software loaded onto the client device 104, such as the operating system 1114, an application (or app) 1116, a web browser 1117, and/or any other software. In some examples, the example client device 104 of FIG. 11 is a non-locally metered device. For example, the client device 104 of a non-panelist household does not support and/or has not been provided with specific metering software (e.g., dedicated metering software provided directly by the AME 108 and executing as a foreground or background process for the sole purpose of monitoring media accesses/exposure).

Any of the example software 1114-1117 may present media 1118 received from a media publisher 1120. The media 1118 may be an advertisement, video, audio, text, a graphic, a web page, news, educational media, entertainment media, or any other type of media. In the illustrated example, a media ID 1122 is provided in the media 1118 to enable identifying the media 1118 so that the AME 108 can credit the media 1118 with media impressions when the media 1118 is presented on the client device 104 or any other device that is monitored by the AME 108.

The data collector 1112 of the illustrated example includes instructions (e.g., Java, java script, or any other computer language or script) that, when executed by the client device 104, cause the client device 104 to collect the media ID 1122 of the media 1118 presented by the app program 1116 and/or the client device 104, and to collect one or more device/user identifier(s) 114 stored in the client device 104. The device/user identifier(s) 114 of the illustrated example include identifiers that can be used by corresponding ones of the partner database proprietors 110a, 110b to identify the user or users of the client device 104, and to locate user information 1102a, 1102b corresponding to the user(s). For example, the device/user identifier(s) 114 used in connection with examples of FIG. 11 may include hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), third-party service identifiers (e.g., advertising service identifiers, device usage analytics service identifiers, demographics collection service identifiers), web storage data, document object model (DOM) storage data, local shared objects (also referred to as "Flash cookies"), an automobile vehicle identification number (VIN), etc. In some examples, fewer or more device/user identifier(s) 114 may be used. In addition, although only two partner database proprietors 110a, 110b are shown in FIG. 11, the AME 108 may partner with any number of partner database proprietors to collect distributed user information (e.g., the user information 1102a, 1102b).

In some examples, the client device 104 may not allow access to identification information stored in the client device 104. For such instances, the disclosed examples enable the AME 108 to store an AME-provided identifier (e.g., an identifier managed and tracked by the AME 108) in the client device 104 to track media impressions on the client device 104. For example, the AME 108 may provide instructions in the data collector 1112 to set an AME-provided identifier in memory space accessible by and/or allocated to the app program 1116. The data collector 1112 uses the identifier as a device/user identifier 114. In such examples, the AME-provided identifier set by the data collector 1112 persists in the memory space even when the app program 1116 and the data collector 1112 are not running. In this manner, the same AME-provided identifier can remain associated with the client device 104 for extended durations and from app to app. In some examples in which the data collector 1112 sets an identifier in the client device 104, the AME 108 may recruit a user of the client device 104 as a panelist, and may store user information collected from the user during a panelist registration process and/or collected by monitoring user activities/behavior via the client device 104 and/or any other device used by the user and monitored by the AME 108. In this manner, the AME 108 can associate user information of the user (from panelist data stored by the AME 108) with media impressions attributed to the user on the client device 104.

In the illustrated example, the data collector 1112 sends the media ID 1122 and the one or more device/user identifier(s) 114 as collected data 1126 to the app publisher 1110. Alternatively, the data collector 1112 may be configured to send the collected data 1126 to another collection entity (other than the app publisher 1110) that has been contracted by the AME 108 or is partnered with the AME 108 to collect media ID's (e.g., the media ID 1122) and device/user identifiers (e.g., the device/user identifier(s) 114) from mobile devices (e.g., the client device 104). In the illustrated example, the app publisher 1110 (or a collection entity) sends the media ID 1122 and the device/user identifier(s) 114 as impression data 102 to a server 1132 at the AME 108. The impression data 102 of the illustrated example may include one media ID 1122 and one or more device/user identifier(s) 114 to report a single impression of the media 1118, or it may include numerous media ID's 1122 and device/user identifier(s) 114 based on numerous instances of collected data (e.g., the collected data 1126) received from the client device 104 and/or other mobile devices to report multiple impressions of media.

In the illustrated example, the server 1132 stores the impression data 102 in an AME media impressions store 1134 (e.g., a database or other data structure). Subsequently, the AME 108 sends the device/user identifier(s) 114 to corresponding partner database proprietors (e.g., the partner database proprietors 110a, 110b) to receive user information (e.g., the user information 1102a, 1102b) corresponding to the device/user identifier(s) 114 from the partner database proprietors 110a, 110b so that the AME 108 can associate the user information with corresponding media impressions of media (e.g., the media 1118) presented at mobile devices (e.g., the client device 104).

In some examples, to protect the privacy of the user of the client device 104, the media identifier 1122 and/or the device/user identifier(s) 114 are encrypted before they are sent to the AME 108 and/or to the partner database proprietors 110a, 110b. In other examples, the media identifier 1122 and/or the device/user identifier(s) 114 are not encrypted.

After the AME 108 receives the device/user identifier(s) 114, the AME 108 sends device/user identifier logs 1136a, 1136b to corresponding partner database proprietors (e.g., the partner database proprietors 110a, 110b). In some examples, each of the device/user identifier logs 1136a, 1136b includes a single device/user identifier. In some examples, some or all of the device/user identifier logs 1136a, 1136b include numerous aggregate device/user identifiers 114 received at the AME 108 over time from one or more mobile devices. After receiving the device/user identifier logs 1136a, 1136b, each of the partner database proprietors 110a, 110b looks up its users corresponding to the device/user identifiers 114 in the respective logs 136a-b. In this manner, each of the partner database proprietors 104a-b collects user information 1102a, 1102b corresponding to users identified in the device/user identifier logs 1136a, 1136b for sending to the AME 108. For example, if the partner database proprietor 110a is a wireless service provider and the device/user identifier log 1136a includes IMEI numbers recognizable by the wireless service provider, the wireless service provider accesses its subscriber records to find users having IMEI numbers matching the IMEI numbers received in the device/user identifier log 1136a. When the users are identified, the wireless service provider copies the users' user information to the user information 1102a for delivery to the AME 108.

In some other examples, the example data collector 1112 sends the device/user identifier(s) 114 from the client device 104 to the app publisher 1110 in the collected data 1126, and it also sends the device/user identifier(s) 114 to the media publisher 1120. In such other examples, the data collector 1112 does not collect the media ID 1122 from the media 1118 at the client device 104 as the data collector 1112 does in the example system 1100 of FIG. 11. Instead, the media publisher 1120 that publishes the media 1118 to the client device 104 retrieves the media ID 1122 from the media 1118 that it publishes. The media publisher 1120 then associates the media ID 1122 to the device/user identifier(s) 114 received from the data collector 1112 executing in the client device 104, and sends collected data 138 to the app publisher 1110 that includes the media ID 1122 and the associated device/user identifier(s) 114 of the client device 104. For example, when the media publisher 1120 sends the media 1118 to the client device 104, it does so by identifying the client device 104 as a destination device for the media 1118 using one or more of the device/user identifier(s) 114 received from the client device 104. In this manner, the media publisher 1120 can associate the media ID 1122 of the media 1118 with the device/user identifier(s) 114 of the client device 104 indicating that the media 1118 was sent to the particular client device 104 for presentation (e.g., to generate an impression of the media 1118).

Alternatively, in some other examples in which the data collector 1112 is configured to send the device/user identifier(s) 114 to the media publisher 1120, and the data collector 1112 does not collect the media ID 1122 from the media 1118 at the client device 104, the media publisher 1102 sends impression data 102 to the AME 108. For example, the media publisher 1120 that publishes the media 1118 to the client device 104 also retrieves the media ID 1122 from the media 1118 that it publishes, and associates the media ID 1122 with the device/user identifier(s) 114 of the client device 104. The media publisher 1120 then sends the media impression data 102, including the media ID 1122 and the device/user identifier(s) 114, to the AME 108. For example, when the media publisher 1120 sends the media 1118 to the client device 104, it does so by identifying the client device 104 as a destination device for the media 1118 using one or more of the device/user identifier(s) 114. In this manner, the media publisher 1120 can associate the media ID 1122 of the media 1118 with the device/user identifier(s) 114 of the client device 104 indicating that the media 1118 was sent to the particular client device 104 for presentation (e.g., to generate an impression of the media 1118). In the illustrated example, after the AME 108 receives the impression data 102 from the media publisher 1120, the AME 108 can then send the device/user identifier logs 1136a, 1136b to the partner database proprietors 110a, 110b to request the user information 1102a, 1102b as described above.

Although the media publisher 1120 is shown separate from the app publisher 1110 in FIG. 11, the app publisher 1110 may implement at least some of the operations of the media publisher 1120 to send the media 1118 to the client device 104 for presentation. For example, advertisement providers, media providers, or other information providers may send media (e.g., the media 1118) to the app publisher 1110 for publishing to the client device 104 via, for example, the app program 1116 when it is executing on the client device 104. In such examples, the app publisher 1110 implements the operations described above as being performed by the media publisher 1120.

Additionally or alternatively, in contrast with the examples described above in which the client device 104 sends identifiers to the AME 108 (e.g., via the application publisher 1110, the media publisher 1120, and/or another entity), in other examples the client device 104 (e.g., the data collector 1112 installed on the client device 104) sends the identifiers (e.g., the user/device identifier(s) 114) directly to the respective database proprietors 110a, 110b (e.g., not via the AME 108). In such examples, the example client device 104 sends the media identifier 1122 to the AME 108 (e.g., directly or through an intermediary such as via the application publisher 1110), but does not send the media identifier 1122 to the database proprietors 110a, 110b.

As mentioned above, the example partner database proprietors 110a. 110b provide the user information 1102a, 1102b to the example AME 108 for matching with the media identifier 1122 to form media impression information. As also mentioned above, the database proprietors 110a, 110b are not provided copies of the media identifier 1122. Instead, the client device 104 provides the database proprietors 110a, 110b with impression identifiers 1140. An impression identifier 1140 uniquely identifies an impression event relative to other impression events of the client device 104 so that an occurrence of an impression at the client device 104 can be distinguished from other occurrences of impressions. However, the impression identifier 1140 does not itself identify the media associated with that impression event. In such examples, the impression data 102 from the client device 104 to the AME 108 also includes the impression identifier 1140 and the corresponding media identifier 1122. To match the user information 1102a, 1102b with the media identifier 1122, the example partner database proprietors 110a, 110b provide the user information 1102a, 1102b to the AME 108 in association with the impression identifier 1140 for the impression event that triggered the collection of the user information 1102a, 1102b. In this manner, the AME 108 can match the impression identifier 1140 received from the client device 104 via the impression data 102 to a corresponding impression identifier 1140 received from the partner database proprietors 110a, 110b via the user information 1102a, 1102b to associate the media identifier 1122 received from the client device 104 with demographic information in the user information 1102a, 1102b received from the database proprietors 110a, 110b.

The impression identifier 1140 of the illustrated example is structured to reduce or avoid duplication of audience member counts for audience size measures. For example, the example partner database proprietors 110a, 110b provide the user information 1102a. 1102b and the impression identifier 1140 to the AME 108 on a per-impression basis (e.g., each time a client device 104 sends a request including an encrypted identifier and an impression identifier 1140 to the partner database proprietor 110a, 110b) and/or on an aggregated basis. When aggregate impression data is provided in the user information 1102a, 1102b, the user information 1102a, 1102b includes indications of multiple impressions (e.g., multiple impression identifiers 1140) at mobile devices. In some examples, aggregate impression data includes unique audience values (e.g., a measure of the quantity of unique audience members exposed to particular media), total impression count, frequency of impressions, etc. In some examples, the individual logged impressions are not discernable from the aggregate impression data.

As such, it is not readily discernable from the user information 1102a, 1102b whether instances of individual user-level impressions logged at the database proprietors 110a, 110b correspond to the same audience member such that unique audience sizes indicated in the aggregate impression data of the user-information 1102a, 1102b are inaccurate for being based on duplicate counting of audience members. However, the impression identifier 1140 provided to the AME 108 enables the AME 108 to distinguish unique impressions and avoid overcounting a number of unique users and/or devices accessing the media. For example, the relationship between the user information 1102a from the partner A database proprietor 110a and the user information 1102b from the partner B database proprietor 110b for the client device 104 is not readily apparent to the AME 108. By including an impression identifier 1140 (or any similar identifier), the example AME 108 can associate user information corresponding to the same user between the user information 1102a, 1102b based on matching impression identifiers 140 stored in both of the user information 1102a, 1102b. The example AME 108 can use such matching impression identifiers 1140 across the user information 1102a, 1102b to avoid overcounting mobile devices and/or users (e.g., by only counting unique users instead of counting the same user multiple times).

A same user may be counted multiple times if, for example, an impression causes the client device 104 to send multiple user/device identifiers to multiple different database proprietors 110a, 110b without an impression identifier (e.g., the impression identifier 1140). For example, a first one of the database proprietors 110a sends first user information 1102a to the AME 108, which signals that an impression occurred. In addition, a second one of the database proprietors 110b sends second user information 1102b to the AME 108, which signals (separately) that an impression occurred. In addition, separately, the client device 104 sends an indication of an impression to the AME 108. Without knowing that the user information 1102a, 1102b is from the same impression, the AME 108 has an indication from the client device 104 of a single impression and indications from the database proprietors 110a, 110b of multiple impressions.

To avoid overcounting impressions, the AME 108 can use the impression identifier 1140. For example, after looking up user information 1102a, 1102b, the example partner database proprietors 110a, 110b transmit the impression identifier 1140 to the AME 108 with corresponding user information 1102a, 1102b. The AME 108 matches the impression identifier 1140 obtained directly from the client device 104 to the impression identifier 1140 received from the database proprietors 110a, 110b with the user information 102a-b to thereby associate the user information 1102a, 1102b with the media identifier 1122 and to generate impression information. This is possible because the AME 108 received the media identifier 1122 in association with the impression identifier 1140 directly from the client device 104. Therefore, the AME 108 can map user data from two or more database proprietors 110a, 110b to the same media exposure event, thus avoiding double counting.

Each unique impression identifier 1140 in the illustrated example is associated with a specific impression of media on the client device 104. The partner database proprietors 110a, 110b receive the respective user/device identifiers 114 and generate the user information 1102a, 1102b independently (e.g., without regard to others of the partner database proprietors 104*a-b*) and without knowledge of the media identifier 1122 involved in the impression. Without an indication that a particular user demographic profile in the user information 1102*a* (received from the partner database proprietor 110*a*) is associated with (e.g., the result of) the same impression at the client device 104 as a particular user demographic profile in the user information 1102*b* (received from the partner database proprietor 110*b* independently of the user information 1102*a* received from the partner database proprietor 110*a*), and without reference to the impression identifier 1140, the AME 108 may not be able to associate the user information 1102*a* with the user information 1102*b* and/or cannot determine that the different pieces of user information 1102*a*, 1102*b* are associated with a same impression and could, therefore, count the user information 1102*a* and the user information 1102*b* as corresponding to two different users/devices and/or two different impressions.

The examples of FIG. 11 illustrate methods and apparatus for collecting impression data at an audience measurement entity (or other entity). The examples of FIG. 11 may be used to collect impression information for any type of media, including static media (e.g., advertising images), streaming media (e.g., streaming video and/or audio, including content, advertising, and/or other types of media), and/or other types of media. For static media (e.g., media that does not have a time component such as images, text, a webpage, etc.), the example AME 108 records an impression once for each occurrence of the media being presented, delivered, or otherwise provided to the client device 104. For streaming media (e.g., video, audio, etc.), the example AME 108 measures demographics for media occurring over a period of time. For example, the AME 108 (e.g., via the app publisher 1110 and/or the media publisher 1120) provides beacon instructions to a client application or client software (e.g., the OS 1114, the web browser 1117, the app 1116, etc.) executing on the client device 104 when media is loaded at client application/software 1114-1117. In some examples, the beacon instructions are embedded in the streaming media and delivered to the client device 106 via the streaming media. In some examples, the beacon instructions cause the client application/software 1114-1117 to transmit a request (e.g., a pingback message) to an impression monitoring server 1132 at regular and/or irregular intervals (e.g., every minute, every 30 seconds, every 2 minutes, etc.). The example impression monitoring server 1132 identifies the requests from the web browser 1117 and, in combination with one or more database proprietors, associates the impression information for the media with demographics of the user of the web browser 1117.

In some examples, a user loads (e.g., via the browser 1117) a web page from a web site publisher, in which the web page corresponds to a particular 60-minute video. As a part of or in addition to the example web page, the web site publisher causes the data collector 1112 to send a pingback message (e.g., a beacon request) to a beacon server 1142 by, for example, providing the browser 1117 with beacon instructions. For example, when the beacon instructions are executed by the example browser 1117, the beacon instructions cause the data collector 1112 to send pingback messages (e.g., beacon requests, HTTP requests, pings) to the impression monitoring server 1132 at designated intervals (e.g., once every minute or any other suitable interval). The example beacon instructions (or a redirect message from, for example, the impression monitoring server 1132 or a database proprietor 104*a-b*) further cause the data collector 1112 to send pingback messages or beacon requests to one or more database proprietors 110*a*, 110*b* that collect and/or maintain demographic information about users. The database proprietor 110*a*, 110*b* transmits demographic information about the user associated with the data collector 1112 for combining or associating with the impression determined by the impression monitoring server 1132. If the user closes the web page containing the video before the end of the video, the beacon instructions are stopped, and the data collector 1112 stops sending the pingback messages to the impression monitoring server 1132. In some examples, the pingback messages include timestamps and/or other information indicative of the locations in the video to which the numerous pingback messages correspond. By determining a number and/or content of the pingback messages received at the impression monitoring server 1132 from the client device 104, the example impression monitoring server 1132 can determine that the user watched a particular length of the video (e.g., a portion of the video for which pingback messages were received at the impression monitoring server 1132).

The client device 104 of the illustrated example executes a client application/software 1114-1117 that is directed to a host website (e.g., www.acme.com) from which the media 1118 (e.g., audio, video, interactive media, streaming media, etc.) is obtained for presenting via the client device 104. In the illustrated example, the media 1118 (e.g., advertisements and/or content) is tagged with identifier information (e.g., a media ID 1122, a creative type ID, a placement ID, a publisher source URL, etc.) and a beacon instruction. The example beacon instruction causes the client application/software 1114-1117 to request further beacon instructions from a beacon server 1142 that will instruct the client application/software 1114-1117 on how and where to send beacon requests to report impressions of the media 1118. For example, the example client application/software 1114-1117 transmits a request including an identification of the media 1118 (e.g., the media identifier 1122) to the beacon server 1142. The beacon server 1142 then generates and returns beacon instructions 1144 to the example client device 104. Although the beacon server 1142 and the impression monitoring server 132 are shown separately, in some examples the beacon server 1142 and the impression monitoring server 1132 are combined. In the illustrated example, beacon instructions 1144 include URLs of one or more database proprietors (e.g., one or more of the partner database proprietors 110*a*, 110*b*) or any other server to which the client device 104 should send beacon requests (e.g., impression requests). In some examples, a pingback message or beacon request may be implemented as an HTTP request. However, whereas a transmitted HTTP request identifies a webpage or other resource to be downloaded, the pingback message or beacon request includes the audience measurement information (e.g., ad campaign identification, content identifier, and/or device/user identification information) as its payload. The server to which the pingback message or beacon request is directed is programmed to log the audience measurement data of the pingback message or beacon request as an impression (e.g., an ad and/or content impression depending on the nature of the media tagged with the beaconing instructions). In some examples, the beacon instructions received with the tagged media 1118 include the beacon instructions 1144. In such examples, the client application/software 1114-1117 does not need to request beacon instructions 1144 from a beacon server 1142 because the beacon instructions 1144 are already provided in the tagged media 1118.

When the beacon instructions 1144 are executed by the client device 104, the beacon instructions 1144 cause the client device 104 to send beacon requests (e.g., repeatedly at designated intervals) to a remote server (e.g., the impression monitoring server 1132, the media publisher 1120, the database proprietors 110a, 110b, or another server) specified in the beacon instructions 1144. In the illustrated example, the specified server is a server of the AME 108, namely, at the impression monitoring server 1132. The beacon instructions 1144 may be implemented using JavaScript or any other types of instructions or script executable via a client application (e.g., a web browser) including, for example, Java, HTML, etc.

Figure 12:
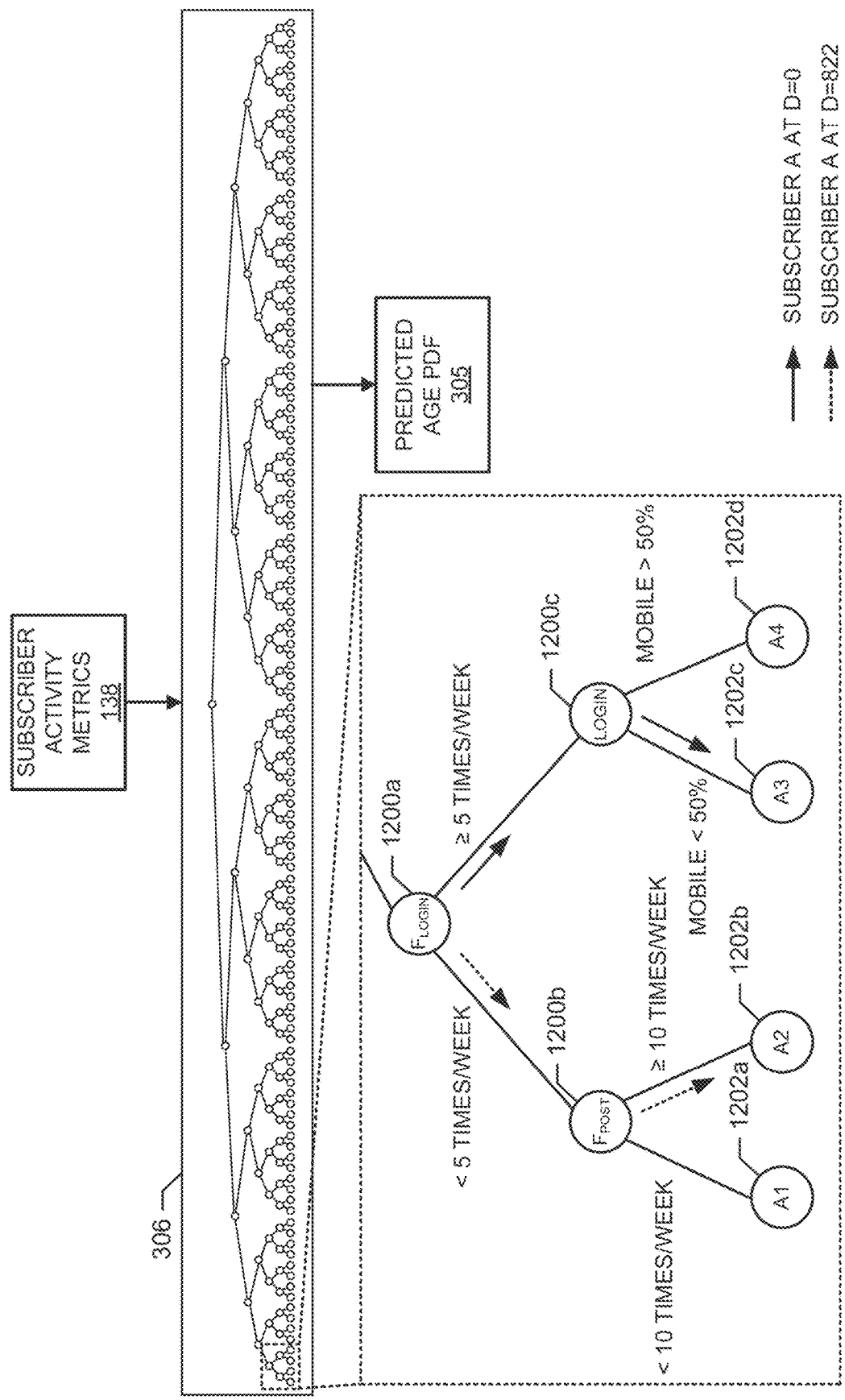
FIG. 12 depicts an example classification tree that may be employed to generate an age prediction model that uses subscriber activity metrics to predict real ages of subscribers of a database proprietor.

FIG. 12 depicts an example age prediction model 306 generated based on a classification tree (e.g., a decision tree) that uses subscriber activity metrics 138 to predict real ages (e.g., predicted age PDFs 305) of subscribers of a database proprietor 110 (FIG. 1). The example subscriber activity metrics 138 include, but are not limited to, user age reported to database proprietor, number of contacts (e.g., friends, connections, etc.), median age of contacts, privacy of birthdate (e.g., birthdate is or is not displayed to contacts), year of high school graduation, gender, whether a current address is associated with the subscriber's profile, whether a profile picture is associated with the subscriber's profile, whether a mobile phone number is associated with the subscriber's profile, subscriber activity that occurred within the last thirty days, subscriber activity that occurred within the last seven days, email address the subscriber used to register is in the .edu domain, percent of contacts that are female, degree of privacy settings (e.g., high privacy, medium privacy, low privacy, etc.), frequency of login (FLOGIN), frequency of posting status updates (FPOST), percentage of logins done via a mobile device (LOGIN), whether a relationship status is associated with the subscriber's profile, number of days since the subscriber registered with the database proprietor, number of messages sent in the past seven days, webpages viewed in the past seven days, etc.

In the illustrated example of FIG. 12, the age prediction model 306 is a classification tree. In the illustrated example of FIG. 12, the classification tree implementing the age prediction model 306 may include many nodes and terminals. A detailed view of a portion of the example age prediction model 306 is shown in FIG. 12 in which the example age prediction model has intermediate (e.g., decision) nodes 1200a-1200c and terminal (e.g., prediction) nodes 1202a-1202d. The intermediate nodes 1200a-1200c represent test conditions based on the subscriber activity metrics 138 that result in branching paths. For example, an intermediate node 1200a may represent a test condition based on the frequency with which a subscriber logs into the database proprietor 110. In such an example, the test condition may be whether the subscriber logs into the database proprietor either (i) less than five times per week (<5 times/week), or (ii) greater than or equal to five times per week (≥5 times/week). The branching paths may either lead to another intermediate node 1200b-1200c or one of the terminal nodes 1202a-1202d. In the illustrated example, the example terminal nodes 1202a-1202d represent a classification (e.g., the predicted age PDF 305) based on the subscriber activity metrics 138 that is output from the age prediction model 306 (e.g., and used by the age predictor 304 of FIG. 3).

However, the predictive value of the age prediction model 306 model degrades over time as subscriber behaviors (e.g., as measured by subscriber activity metrics 138) on which the age prediction model 306 is based change over time. In some examples, small changes in subscriber-behavior can change the terminal node 1202a-1202d reached by the age prediction model 306. The manner in which outcomes are affect by such small behavior changes is observable using the example age prediction model 306 of FIG. 12. For example, in FIG. 12, the age prediction model 306 is used to predict the real age (e.g., a predicted age PDF 305 associated with terminal nodes 1202a-1202d) of a subscriber (e.g. "Subscriber A") at day D=0 and at day D=822. In the illustrated example, the age prediction model 306 is generated on day D=0. On day D=0, the login frequency of the subscriber A is greater than or equal to five times per week. As a result, a decision at an intermediate node 1200a using login frequency (FLOGIN) as a test condition, the branches down a path that leads to an intermediate node 1202c. In the illustrated example, a decision at an intermediate node 1200c using login type (LOGIN) as a test condition branches down a path leading to a terminal node 1202c because less than 50% of the logins by subscriber A are via a mobile device type when logging into the database proprietor 110. In the illustrated example, by day D=822 (e.g., 822 days after day D=0), the subscriber activity metrics 138 of the subscriber A change so that frequency of login (FLOGIN) is less than five times per week. As a result, if the prediction model 306 generated on day D=0 is used to predict the real age of the subscriber on day D=822, the resulting terminal node 1202b would be different compared to the results on day D=0.

Figure 13:
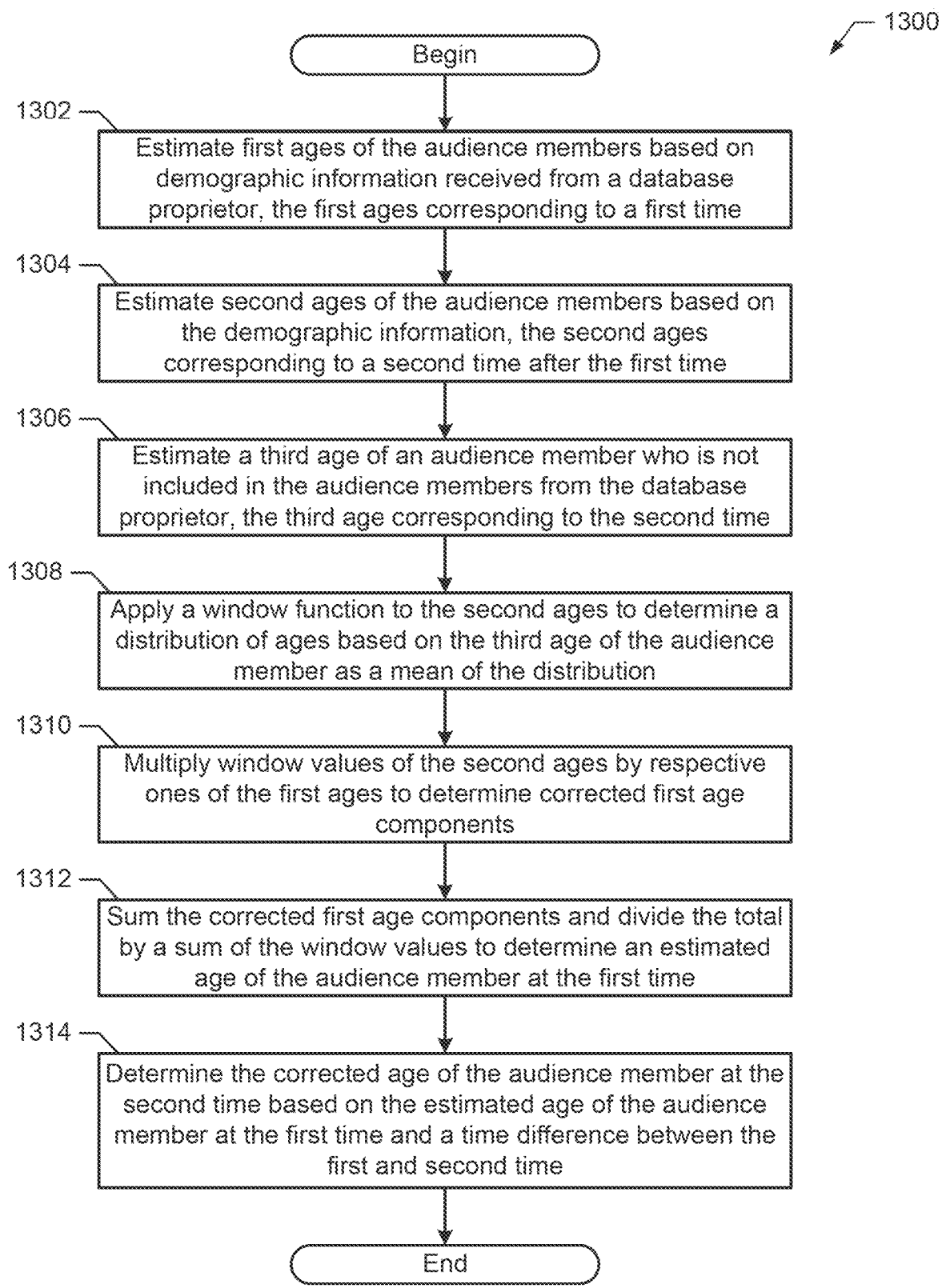
FIG. 13 is a flow diagram representative of example machine readable instructions that may be executed to implement the example audience measurement entity of FIG. 6 to correct for time-based deterioration of an age prediction model.

FIG. 13 is a flow diagram representative of example machine readable instructions 1300 that may be executed to implement the example audience measurement entity 108 of FIG. 6 and/or the age corrector 124 of FIG. 3 to correct for time-based deterioration of an age prediction model (e.g., the age prediction model 306 of FIG. 3). The example instructions 1300 may be executed after collecting impression information (e.g., via the AME impressions collector 618 of FIG. 6) and receiving demographic information (e.g., numbers of impressions and/or audience counts attributed to demographic groups, where the demographic groups are defined at least partially based on ages) corresponding to the impression information (e.g., via the DP impressions collector 630).

The example age predictor 304 of FIG. 3 estimates first ages of the audience members based on demographic information received from a database proprietor (e.g., the database proprietor 110) (block 1302). In the example of FIG. 13, the first ages correspond to a first time, such as the time at which an age prediction model 306 used to estimate the first ages is trained or calibrated.

The example age predictor 304 estimates second ages of the audience members based on the demographic information (block 1304). In the example of FIG. 13, the second ages correspond to a second time that is after the first time. The example age predictor 304 uses the same age prediction model 306 used to estimate the first ages, which may have decreased in accuracy between the first time and the second time.

The example age predictor 304 estimates a third age of an audience member who is not included in the audience members from the database proprietor 110 (block 1306). In the example of FIG. 13, the third age is estimated using the same age prediction model used to estimate the first ages and the second ages, and corresponds to the second time. As a result, the third age may have a reduced accuracy compared to if the age prediction model 306 was recently trained and/or calibrated. In some examples, the age predictor 304 estimates of the third age in response to determining that the audience member has not been previously identified. For example, the age predictor 304 may determine that the audience member not being associated with an AME identifier such as an AME cookie.

Blocks 1302, 1304, and/or 1306 may be implemented as described above in connection with FIGS. 7 and/or 8 above. For example, the predicted first, second, and third ages may each have multiple ages and associated probabilities based on the definitions of the age prediction probability density functions and/or the decision tree. As described below, the example model corrector 312 may correct the ages in the age prediction PDFs for deterioration of the age prediction model that is used to determine the age prediction PDFs. In some examples, the age prediction PDFs are converted to a single age by, for example, weighting the ages in the age prediction PDFs by the respective probabilities of those ages. In some examples, the conversion of age prediction PDFs to age values may be influenced by additional correction factors.

In some examples, the age predictor 304 performs blocks 1302, 1304, and/or 1306 in response to request(s) by the model corrector 312. In some examples, the model corrector 312 selects the audience members for determination of the first and second ages from a larger set of audience members based on the third age. In some such examples, the age predictor 304 performs block 1306 prior to blocks 1302 and 1304, and the audience members are selected to be within an upper threshold age difference from the third age. In some other examples, the audience members are selected from the larger set of audience members to be within a same age bucket as the third age.

The example model corrector 312 of FIG. 3 applies a window function to the second ages to determine a distribution of ages (block 1308). In the example of FIG. 13, the model corrector 312 uses the third age of the audience member as a mean of the distribution. The example window function may be a probability density function value (e.g., Equation 6 below), in which the third age is the mean u and the standard deviation σ value is 1 but may be selected based on empirical observations.

$$f(x \mid \mu, \sigma) = \frac{1}{\sigma\sqrt{2\pi}} e^{-\frac{(x-\mu)^2}{2\sigma^2}}$$

(Equation 6)

The second ages (input as x in Equation 6) are used to calculate the respective window values. When the window values are determined, the example model corrector 312 multiplies the window values of the second ages by respective ones of the first ages to determine corrected first age components (block 1310). For example, a window value that is calculated for a second age of a first subscriber is multiplied by the first age of the same first subscriber.

The example model corrector 312 sums the corrected first age components and divides the total by a sum of the window values to determine an estimated age of the audience member at the first time (block 1312). For example, the model corrector 312 may determine the estimated age of the audience member at the first time as a weighted average of the first ages, using the window values determined from the third age as the weights. As the third age changes, the weights applied to the first ages change using the example window function (e.g., distribution).

The example model corrector 312 determines the corrected age of the audience member at the second time based on the estimated age of the subscriber at the first time and a time difference between the first and second times (block 1314). For example, the model corrector 312 ages the audience member from the corrected age at the first time (determined in block 1312) to the later time. In other words, if the difference between the first time and the later time is 2.00 years, the example model corrector 312 adds 2.00 years to the corrected age determined in block 1312 to obtain the corrected age at the later time.

The example instructions 1300 then end and/or repeat for another subscriber. Example implementations of FIG. 13 are described below in connection with FIGS. 14 and 15.

Figure 14:
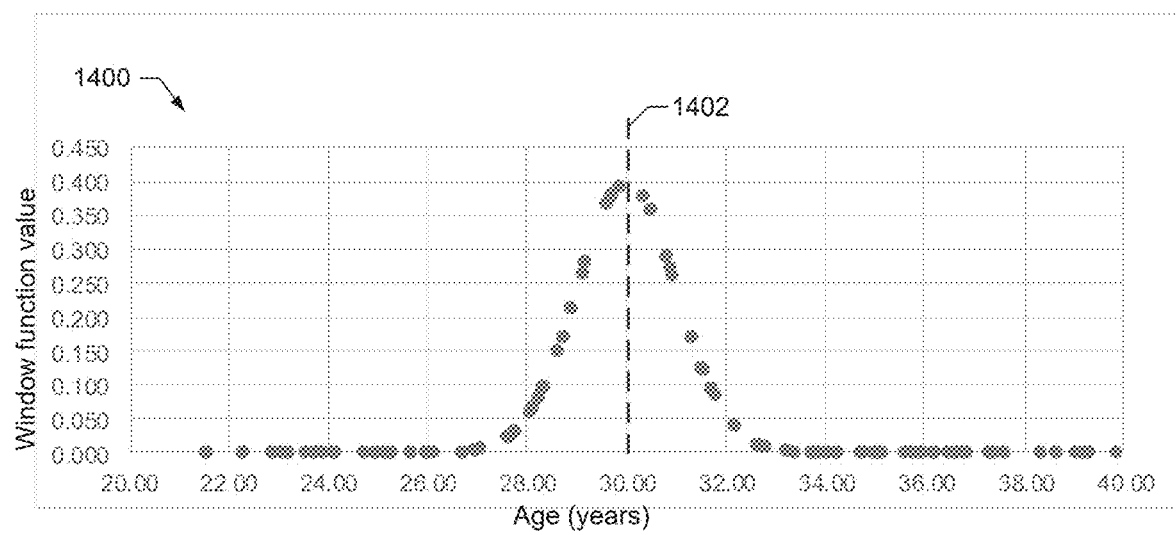
FIG. 14 is a graph of an example distribution that may be generated by the model corrector of FIG. 3 to correct for deterioration of the age prediction model for a first example estimated age.

FIG. 14 is a graph of an example distribution 1400 that may be generated by the model corrector 312 of FIG. 3 to correct for deterioration of the age prediction model 306. The model corrector 312 uses a predicted age of a new audience member at the later time (e.g., significantly later than the training or calibration of the age prediction model) as the mean value 1402 of the distribution 1400. In the example of FIG. 14, the mean value 1402 is 30.00 years old. Table 1 below includes first estimated ages of a group of audience members for a first time (e.g., a time at which the age prediction model 306 is trained or calibrated, such as t=0 years), second estimated ages of the group of audience members for a second time after the first time (e.g., t=2 years), and distribution values based on the second ages and the predicted age. In the example of FIG. 14 and Table 1, the distribution values are probability density function values. The graph of FIG. 14 shows the window values as a function of the corresponding estimated age at the later time.

TABLE 6

Example Estimated Ages of a group of 100 Audience Members at times t = 0 and t = 2, and Window Function values of ages at time t = 2, for a distribution mean of 30.00

| Index | Model t = 0 | Model t = 2 | window |
|---|---|---|---|
| 1 | 27.00 | 28.09 | 0.065 |
| 2 | 25.13 | 26.91 | 0.003 |
| 3 | 39.28 | 40.60 | 0.000 |
| 4 | 37.21 | 38.31 | 0.000 |
| 5 | 22.25 | 23.53 | 0.000 |
| 6 | 35.55 | 37.38 | 0.000 |
| 7 | 39.75 | 40.93 | 0.000 |
| 8 | 39.64 | 41.37 | 0.000 |
| 9 | 31.50 | 33.21 | 0.002 |
| 10 | 31.95 | 33.20 | 0.002 |
| 11 | 39.76 | 41.65 | 0.000 |
| 12 | 24.73 | 26.01 | 0.000 |
| 13 | 26.82 | 28.06 | 0.061 |
| 14 | 32.39 | 34.04 | 0.000 |
| 15 | 28.53 | 29.60 | 0.369 |
| 16 | 27.51 | 28.89 | 0.215 |
| 17 | 33.78 | 34.97 | 0.000 |
| 18 | 35.28 | 36.78 | 0.000 |
| 19 | 26.46 | 27.62 | 0.023 |
| 20 | 39.71 | 41.02 | 0.000 |
| 21 | 20.59 | 22.27 | 0.000 |
| 22 | 30.68 | 32.61 | 0.013 |
| 23 | 39.92 | 41.86 | 0.000 |
| 24 | 33.84 | 35.13 | 0.000 |
| 25 | 40.00 | 41.47 | 0.000 |
| 26 | 23.74 | 25.63 | 0.000 |
| 27 | 33.12 | 34.24 | 0.000 |
| 28 | 32.38 | 33.87 | 0.000 |
| 29 | 22.22 | 23.86 | 0.000 |
| 30 | 29.87 | 31.51 | 0.127 |
| 31 | 30.32 | 32.16 | 0.039 |
| 32 | 22.89 | 24.07 | 0.000 |
| 33 | 28.13 | 29.62 | 0.371 |
| 34 | 31.46 | 32.71 | 0.010 |
| 35 | 27.29 | 29.10 | 0.265 |
| 36 | 33.04 | 34.79 | 0.000 |
| 37 | 37.65 | 39.19 | 0.000 |
| 38 | 28.94 | 30.92 | 0.262 |

TABLE 6-continued

Example Estimated Ages of a group of 100 Audience Members at times t = 0 and t = 2, and Window Function values of ages at time t = 2, for a distribution mean of 30.00

| Index | Model t = 0 | Model t = 2 | window |
|---|---|---|---|
| 39 | 27.57 | 29.17 | 0.283 |
| 40 | 21.91 | 23.72 | 0.000 |
| 41 | 21.10 | 23.08 | 0.000 |
| 42 | 21.97 | 23.72 | 0.000 |
| 43 | 32.08 | 33.37 | 0.001 |
| 44 | 34.82 | 35.90 | 0.000 |
| 45 | 29.73 | 31.69 | 0.095 |
| 46 | 26.86 | 28.60 | 0.150 |
| 47 | 32.01 | 33.80 | 0.000 |
| 48 | 33.20 | 35.06 | 0.000 |
| 49 | 39.48 | 40.85 | 0.000 |
| 50 | 34.16 | 35.59 | 0.000 |
| 51 | 27.16 | 28.33 | 0.099 |
| 52 | 23.62 | 24.95 | 0.000 |
| 53 | 39.58 | 41.39 | 0.000 |
| 54 | 20.06 | 21.54 | 0.000 |
| 55 | 38.34 | 39.85 | 0.000 |
| 56 | 29.46 | 30.87 | 0.274 |
| 57 | 23.98 | 25.95 | 0.000 |
| 58 | 35.40 | 36.62 | 0.000 |
| 59 | 26.51 | 27.76 | 0.033 |
| 60 | 34.89 | 36.83 | 0.000 |
| 61 | 35.82 | 37.30 | 0.000 |
| 62 | 35.91 | 37.26 | 0.000 |
| 63 | 26.69 | 28.30 | 0.095 |
| 64 | 31.43 | 32.79 | 0.008 |
| 65 | 24.95 | 26.12 | 0.000 |
| 66 | 37.68 | 39.29 | 0.000 |
| 67 | 21.37 | 23.17 | 0.000 |
| 68 | 29.31 | 30.33 | 0.378 |
| 69 | 26.39 | 27.61 | 0.023 |
| 70 | 28.97 | 30.80 | 0.290 |
| 71 | 28.22 | 29.70 | 0.381 |
| 72 | 24.22 | 25.26 | 0.000 |
| 73 | 20.77 | 22.30 | 0.000 |
| 74 | 34.70 | 36.18 | 0.000 |
| 75 | 29.93 | 31.53 | 0.123 |
| 76 | 37.33 | 39.03 | 0.000 |
| 77 | 29.29 | 30.46 | 0.358 |
| 78 | 21.53 | 22.85 | 0.000 |
| 79 | 35.23 | 36.47 | 0.000 |
| 80 | 23.44 | 25.13 | 0.000 |
| 81 | 22.24 | 24.12 | 0.000 |
| 82 | 38.35 | 40.03 | 0.000 |
| 83 | 23.21 | 24.70 | 0.000 |
| 84 | 39.08 | 40.21 | 0.000 |
| 85 | 29.83 | 31.29 | 0.173 |
| 86 | 25.23 | 26.68 | 0.002 |
| 87 | 32.96 | 34.70 | 0.000 |
| 88 | 32.65 | 33.70 | 0.000 |
| 89 | 26.71 | 28.21 | 0.080 |
| 90 | 30.69 | 31.76 | 0.085 |
| 91 | 27.92 | 29.85 | 0.395 |
| 92 | 35.68 | 37.57 | 0.000 |
| 93 | 34.26 | 35.77 | 0.000 |
| 94 | 34.58 | 35.94 | 0.000 |
| 95 | 37.05 | 38.65 | 0.000 |
| 96 | 25.54 | 27.06 | 0.005 |
| 97 | 39.70 | 41.01 | 0.000 |
| 98 | 27.40 | 28.71 | 0.173 |
| 99 | 28.33 | 29.66 | 0.376 |
| 100 | 35.35 | 37.33 | 0.000 |

The example model corrector 312 multiplies the window values of Table 6 above by the corresponding ages at time t=0 of Table 6 above (e.g., 27.00*0.065 for audience member 1, 25.13*0.003 for audience member 2, etc.) to apply the distribution to the ages at the time t=0 (e.g., age components at time t=0). The model corrector 312 then sums the age components to determine a corrected age of the new audience member at time t=0. In the example of Table 6, there are 100 age components to be added. Using the example ages in Table 6 and an estimated age of 30.00 at time t=2, the example model corrector 312 determines the corrected age at time t=0 to be 28.42 years. To determine the corrected age of the new audience member at time t=2, the example model corrector 312 adds the difference between times t=0 and t=2 (e.g., 2 years) to the corrected age at time t=0. In the example of FIG. 14 and Table 6, the example model corrector 312 determines the corrected age at time t=2 to be 30.42 years (e.g., 28.42 years+(2-0) years).

Figure 15:
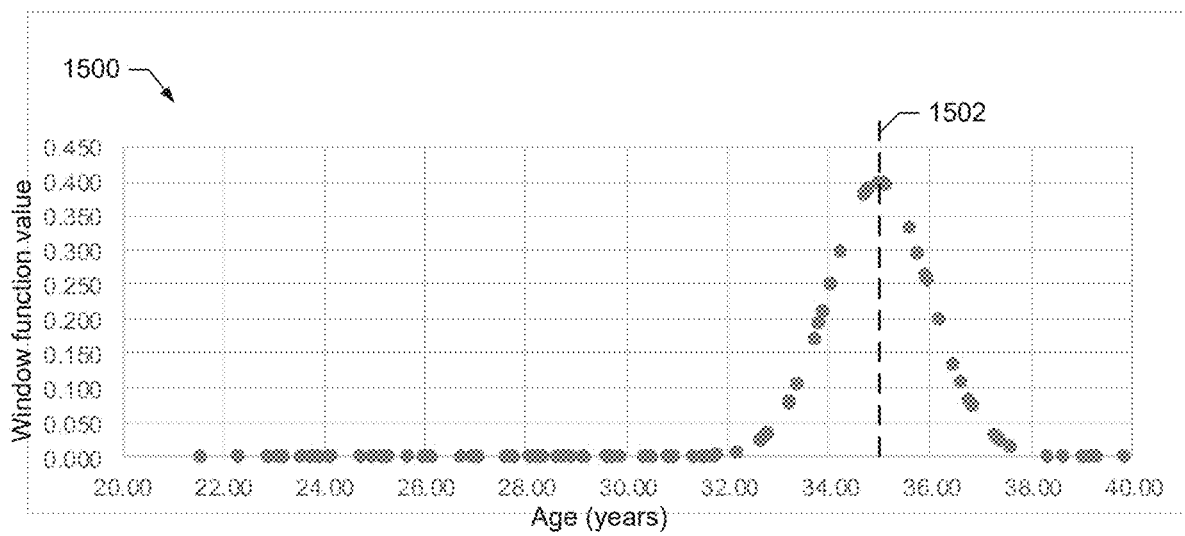
FIG. 15 is a graph of another example distribution that may be generated by the model corrector of FIG. 3 to correct for deterioration of the age prediction model for a second example estimated age.

FIG. 15 is a graph of another example distribution 1500 that may be generated by the model corrector 312 of FIG. 3 to correct for deterioration of the age prediction model 306. The example distribution 1500 of FIG. 15 uses a predicted age of 35.00 as the mean 1502 instead of the mean of 30.00 of FIG. 14. Table 7 below includes distribution values for the second estimated ages using the mean value 1502 of 35.00.

TABLE 7

Example Estimated Ages of a group of 100 Audience Members at times t = 0 and t = 2, and Window Function values of ages at time t = 2, for a distribution mean of 35.00

| Index | Model t = 0 | Model t = 2 | Window |
|---|---|---|---|
| 1 | 27.00 | 28.09 | 0.000 |
| 2 | 25.13 | 26.91 | 0.000 |
| 3 | 39.28 | 40.60 | 0.000 |
| 4 | 37.21 | 38.31 | 0.002 |
| 5 | 22.25 | 23.53 | 0.000 |
| 6 | 35.55 | 37.38 | 0.024 |
| 7 | 39.75 | 40.93 | 0.000 |
| 8 | 39.64 | 41.37 | 0.000 |
| 9 | 31.50 | 33.21 | 0.081 |
| 10 | 31.95 | 33.20 | 0.079 |
| 11 | 39.76 | 41.65 | 0.000 |
| 12 | 24.73 | 26.01 | 0.000 |
| 13 | 26.82 | 28.06 | 0.000 |
| 14 | 32.39 | 34.04 | 0.251 |
| 15 | 28.53 | 29.60 | 0.000 |
| 16 | 27.51 | 28.89 | 0.000 |
| 17 | 33.78 | 34.97 | 0.399 |
| 18 | 35.28 | 36.78 | 0.082 |
| 19 | 26.46 | 27.62 | 0.000 |
| 20 | 39.71 | 41.02 | 0.000 |
| 21 | 20.59 | 22.27 | 0.000 |
| 22 | 30.68 | 32.61 | 0.023 |
| 23 | 39.92 | 41.86 | 0.000 |
| 24 | 33.84 | 35.13 | 0.396 |
| 25 | 40.00 | 41.47 | 0.000 |
| 26 | 23.74 | 25.63 | 0.000 |
| 27 | 33.12 | 34.24 | 0.299 |
| 28 | 32.38 | 33.87 | 0.212 |
| 29 | 22.22 | 23.86 | 0.000 |
| 30 | 29.87 | 31.51 | 0.001 |
| 31 | 30.32 | 32.16 | 0.007 |
| 32 | 22.89 | 24.07 | 0.000 |
| 33 | 28.13 | 29.62 | 0.000 |
| 34 | 31.46 | 32.71 | 0.029 |
| 35 | 27.29 | 29.10 | 0.000 |
| 36 | 33.04 | 34.79 | 0.390 |
| 37 | 37.65 | 39.19 | 0.000 |
| 38 | 28.94 | 30.92 | 0.000 |
| 39 | 27.57 | 29.17 | 0.000 |
| 40 | 21.91 | 23.72 | 0.000 |
| 41 | 21.10 | 23.08 | 0.000 |
| 42 | 21.97 | 23.72 | 0.000 |
| 43 | 32.08 | 33.37 | 0.105 |
| 44 | 34.82 | 35.90 | 0.266 |
| 45 | 29.73 | 31.69 | 0.002 |
| 46 | 26.86 | 28.60 | 0.000 |
| 47 | 32.01 | 33.80 | 0.194 |
| 48 | 33.20 | 35.06 | 0.398 |
| 49 | 39.48 | 40.85 | 0.000 |
| 50 | 34.16 | 35.59 | 0.334 |

TABLE 7-continued

Example Estimated Ages of a group of 100 Audience Members at times t = 0 and t = 2, and Window Function values of ages at time t = 2, for a distribution mean of 35.00

| Index | Model t = 0 | Model t = 2 | Window |
|---|---|---|---|
| 51 | 27.16 | 28.33 | 0.000 |
| 52 | 23.62 | 24.95 | 0.000 |
| 53 | 39.58 | 41.39 | 0.000 |
| 54 | 20.06 | 21.54 | 0.000 |
| 55 | 38.34 | 39.85 | 0.000 |
| 56 | 29.46 | 30.87 | 0.000 |
| 57 | 23.98 | 25.95 | 0.000 |
| 58 | 35.40 | 36.62 | 0.108 |
| 59 | 26.51 | 27.76 | 0.000 |
| 60 | 34.89 | 36.83 | 0.075 |
| 61 | 35.82 | 37.30 | 0.029 |
| 62 | 35.91 | 37.26 | 0.031 |
| 63 | 26.69 | 28.30 | 0.000 |
| 64 | 31.43 | 32.79 | 0.035 |
| 65 | 24.95 | 26.12 | 0.000 |
| 66 | 37.68 | 39.29 | 0.000 |
| 67 | 21.37 | 23.17 | 0.000 |
| 68 | 29.31 | 30.33 | 0.000 |
| 69 | 26.39 | 27.61 | 0.000 |
| 70 | 28.97 | 30.80 | 0.000 |
| 71 | 28.22 | 29.70 | 0.000 |
| 72 | 24.22 | 25.26 | 0.000 |
| 73 | 20.77 | 22.30 | 0.000 |
| 74 | 34.70 | 36.18 | 0.200 |
| 75 | 29.93 | 31.53 | 0.001 |
| 76 | 37.33 | 39.03 | 0.000 |
| 77 | 29.29 | 30.46 | 0.000 |
| 78 | 21.53 | 22.85 | 0.000 |
| 79 | 35.23 | 36.47 | 0.135 |
| 80 | 23.44 | 25.13 | 0.000 |
| 81 | 22.24 | 24.12 | 0.000 |
| 82 | 38.35 | 40.03 | 0.000 |
| 83 | 23.21 | 24.70 | 0.000 |
| 84 | 39.08 | 40.21 | 0.000 |
| 85 | 29.83 | 31.29 | 0.000 |
| 86 | 25.23 | 26.68 | 0.000 |
| 87 | 32.96 | 34.70 | 0.381 |
| 88 | 32.65 | 33.70 | 0.172 |
| 89 | 26.71 | 28.21 | 0.000 |
| 90 | 30.69 | 31.76 | 0.002 |
| 91 | 27.92 | 29.85 | 0.000 |
| 92 | 35.68 | 37.57 | 0.015 |
| 93 | 34.26 | 35.77 | 0.297 |
| 94 | 34.58 | 35.94 | 0.257 |
| 95 | 37.05 | 38.65 | 0.001 |
| 96 | 25.54 | 27.06 | 0.000 |
| 97 | 39.70 | 41.01 | 0.000 |
| 98 | 27.40 | 28.71 | 0.000 |
| 99 | 28.33 | 29.66 | 0.000 |
| 100 | 35.35 | 37.33 | 0.026 |

Using the example ages in Table 7 and an estimated age of 35.00 at time t=2, the example model corrector 312 determines the corrected age at time t=0 to be 33.55 years. To determine the corrected age of the new audience member at time t=2, the example model corrector 312 adds the difference between times t=0 and t=2 (e.g., 2 years) to the corrected age at time t=0. In the example of FIG. 15 and Table 2, the example model corrector 312 determines the corrected age at time t=2 to be 35.55 years (e.g., 33.55 years+(2-0) years). While example times t=0 and t=2 are used in the above examples, any other times may be used.

From the foregoing, it will be appreciated that examples have been disclosed which allow association of accurate age-based demographic groups with impressions generated to exposure to media. Additionally, it will be appreciated that examples have been disclosed which enhance the operations of a computer to improve the accuracy of impression-based data so that computers and processing systems therein can be relied upon to produce audience analysis information with higher accuracies.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An audience measurement system for correcting age-based misattribution errors, the audience measurement system comprising:
   a processor; and
   a non-transitory computer-readable storage medium, having stored thereon program instructions that, upon execution by the processor, cause performance of a set of operations comprising:
      receiving, from a database proprietor, anonymized subscriber demographic data of a plurality of subscribers registered with the database proprietor, wherein the anonymized subscriber demographic data comprises corresponding age characteristics of the plurality of subscribers and is based on network communications received by the database proprietor from client devices of the plurality of subscribers;
      storing, in a database, the anonymized subscriber demographic data;
      receiving, from a client device, impression data after a media item is accessed on the client device, wherein the impression data comprises an impression request and a user identifier;
      generating a demographic impression of a plurality of demographic impressions by attributing anonymized subscriber demographic data of a subscriber of the plurality of subscribers to the impression data,
         wherein the demographic impression comprises an impression date and the user identifier, and
         wherein the impression date and the user identifier are matched to the anonymized subscriber demographic data of the subscriber of the plurality of subscribers;
      retrieving, based on the user identifier, a predicted age probability density function,
         wherein the predicted age probability density function defines, for each of a plurality of age ranges, a respective probability that an actual age of the subscriber is within that age range;
      updating the predicted age probability density function to generate an age-corrected probability density function; and
      using the age-corrected probability density function to update the demographic impression to correct the age characteristic of the subscriber; and
      outputting, using the updated demographic impression, media ratings information about the media item, wherein the updated demographic impression comprises a corrected age characteristic of the subscriber.

2. The audience measurement system of claim 1, the set of operations further comprising:
   associating an age-corrected probability density function identifier with the age-corrected probability density function; and
   storing the age-corrected probability density function identifier in a second database.

3. The audience measurement system of claim 1, wherein the set of operations further comprise selecting, using the predicted age probability density function, an age range of the plurality of age ranges that corresponds to the age characteristic of the subscriber.

4. The audience measurement system of claim 1, the set of operations further comprising:
storing, in a second database, the user identifier, an indication of the predicted age probability density function and a prediction date,
wherein the prediction date corresponds to a point in time when the predicted age probability density function was originally predicted;
wherein the user identifier, the indication of the predicted age probability density function, and the prediction date are stored in a same data structure in the second database; and
wherein locating the user identifier from the second database also retrieves the indication of the predicted age probability density function and the prediction date.

5. The audience measurement system of claim 4, wherein the point in time is a first point in time, and wherein the predicted age probability density function is stored at a first point in time.

6. The audience measurement system of claim 5, wherein retrieving the predicted age probability density function occurs at a second point in time; and wherein the second point in time occurs after the first point in time.

7. The audience measurement system of claim 1,
wherein updating the predicted age probability density function comprises:
using a prediction date to determine an aging factor for each of the plurality of age ranges to generate the age-corrected probability density function; and
applying the aging factor to each of the plurality of age ranges.

8. The audience measurement system of claim 7,
wherein applying the aging factor to each of the plurality of age ranges generates a probability for each of the plurality of age ranges that the subscriber is in the respective age range;
wherein using the age-corrected probability density function to update the demographic impression to correct the age characteristic of the subscriber comprises selecting, based on the respective probabilities, an age range of the subscriber; and
wherein the age range is associated with the corrected age characteristic of the subscriber.

9. A method for correcting age-based misattribution errors, the method comprising:
receiving, from a database proprietor, anonymized subscriber demographic data of a plurality of subscribers registered with the database proprietor, wherein the anonymized subscriber demographic data comprises corresponding age characteristics of the plurality of subscribers and is based on network communications received by the database proprietor from client devices of the plurality of subscribers;
storing, in a database, the anonymized subscriber demographic data;
receiving, from a client device, impression data after a media item is accessed on the client device, wherein the impression data comprises an impression request and a user identifier;
generating a demographic impression of a plurality of demographic impressions by attributing anonymized subscriber demographic data of a subscriber of the plurality of subscribers to the impression data,
wherein the demographic impression comprises an impression date and the user identifier, and
wherein the impression date and the user identifier are matched to the anonymized subscriber demographic data of the subscriber of the plurality of subscribers;
retrieving, based on the user identifier, a predicted age probability density function,
wherein the predicted age probability density function defines, for each of a plurality of age ranges, a respective probability that an actual age of the subscriber is within that age range;
updating the predicted age probability density function to generate an age-corrected probability density function; and
using the age-corrected probability density function to update the demographic impression to correct the age characteristic of the subscriber; and
outputting, using the updated demographic impression, media ratings information about the media item, wherein the updated demographic impression comprises a corrected age characteristic of the subscriber.

10. The method of claim 9, further comprising:
associating an age-corrected probability density function identifier with the age-corrected probability density function; and
storing the age-corrected probability density function identifier in a second database.

11. The method of claim 9, further comprising:
storing, in a second database, the user identifier, an indication of the predicted age probability density function and a prediction date,
wherein the prediction date corresponds to a point in time when the predicted age probability density function was originally predicted;
wherein the user identifier, the indication of the predicted age probability density function, and the prediction date are stored in a same data structure in the second database; and
wherein locating the user identifier from the second database also retrieves the indication of the predicted age probability density function and the prediction date.

12. The method of claim 11, wherein the point in time is a first point in time, and wherein the predicted age probability density function is stored at a first point in time.

13. The method of claim 12, wherein retrieving the predicted age probability density function occurs at a second point in time; and wherein the second point in time occurs after the first point in time.

14. The method of claim 9,
wherein updating the predicted age probability density function comprises:
using a prediction date to determine an aging factor for each of the plurality of age ranges to generate the age-corrected probability density function; and
applying the aging factor to each of the plurality of age ranges.

15. The method of claim 14,
wherein applying the aging factor to each of the plurality of age ranges generates a probability for each of the plurality of age ranges that the subscriber is in the respective age range;
wherein using the age-corrected probability density function to update the demographic impression to correct the age characteristic of the subscriber comprises selecting, based on the respective probabilities, an age range of the subscriber; and wherein the age range is associated with the corrected age characteristic of the subscriber.

16. A non-transitory computer-readable storage medium, having stored thereon program instructions that, upon execution by a processor, cause performance of a set of operations comprising:

receiving, from a database proprietor, anonymized subscriber demographic data of a plurality of subscribers registered with the database proprietor, wherein the anonymized subscriber demographic data comprises corresponding age characteristics of the plurality of subscribers and is based on network communications received by the database proprietor from client devices of the plurality of subscribers;

storing, in a database, the anonymized subscriber demographic data;

receiving, from a client device, impression data after a media item is accessed on the client device, wherein the impression data comprises an impression request and a user identifier;

generating a demographic impression of a plurality of demographic impressions by attributing anonymized subscriber demographic data of a subscriber of the plurality of subscribers to the impression data,
wherein the demographic impression comprises an impression date and the user identifier, and
wherein the impression date and the user identifier are matched to the anonymized subscriber demographic data of the subscriber of the plurality of subscribers;

retrieving, based on the user identifier, a predicted age probability density function,
wherein the predicted age probability density function defines, for each of a plurality of age ranges, a respective probability that an actual age of the subscriber is within that age range;

updating the predicted age probability density function to generate an age-corrected probability density function; and using the age-corrected probability density function to update the demographic impression to correct the age characteristic of the subscriber; and outputting, using the updated demographic impression, media ratings information about the media item, wherein the updated demographic impression comprises a corrected age characteristic of the subscriber.

17. The non-transitory computer-readable storage medium of claim 16, the set of operations further comprising:

associating an age-corrected probability density function identifier with the age-corrected probability density function; and storing the age-corrected probability density function identifier in a second database.

18. The non-transitory computer-readable storage medium of claim 16, wherein the set of operations further comprise selecting, using the predicted age probability density function, an age range of the plurality of age ranges that corresponds to the age characteristic of the subscriber.

19. The non-transitory computer-readable storage medium of claim 16, the set of operations further comprising:

storing, in a second database, the user identifier, an indication of the predicted age probability density function and a prediction date,
wherein the prediction date corresponds to a point in time when the predicted age probability density function was originally predicted;
wherein the user identifier, the indication of the predicted age probability density function, and the prediction date are stored in a same data structure in the second database; and
wherein locating the user identifier from the second database also retrieves the indication of the predicted age probability density function and the prediction date.

20. The non-transitory computer-readable storage medium of claim 16, wherein updating the predicted age probability density function comprises:

using a prediction date to determine an aging factor for each of the plurality of age ranges to generate the age-corrected probability density function; and applying the aging factor to each of the plurality of age ranges,
wherein applying the aging factor to each of the plurality of age ranges generates a probability for each of the plurality of age ranges that the subscriber is in the respective age range;
wherein using the age-corrected probability density function to update the demographic impression to correct the age characteristic of the subscriber comprises selecting, based on the respective probabilities, an age range of the subscriber; and
wherein the age range is associated with the corrected age characteristic of the subscriber.

* * * * *